United States Patent
Matsuki et al.

(10) Patent No.: US 7,219,144 B2
(45) Date of Patent: May 15, 2007

(54) DISK ARRAY SYSTEM AND FAULT INFORMATION CONTROL METHOD

(75) Inventors: Kunihito Matsuki, Odawara (JP); Yutaka Takata, Ninomiya (JP); Hiroshi Ogasawara, Odawara (JP); Naotaka Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 54 days.

(21) Appl. No.: 10/745,650

(22) Filed: Dec. 29, 2003

(65) Prior Publication Data

US 2005/0050401 A1 Mar. 3, 2005

(30) Foreign Application Priority Data

Aug. 27, 2003 (JP) ............................. 2003-302303

(51) Int. Cl.
*G06F 15/173* (2006.01)
*G06F 11/00* (2006.01)

(52) U.S. Cl. .......................... 709/223; 714/25; 714/42; 714/2

(58) Field of Classification Search ................ 709/213, 709/223, 224; 714/2, 42, 25
See application file for complete search history.

(56) References Cited

U.S. PATENT DOCUMENTS

| | | | |
|---|---|---|---|
| 4,096,567 A * | 6/1978 | Millard et al. ................. | 707/10 |
| 4,920,479 A | 4/1990 | Hashiguchi | |
| 4,984,239 A * | 1/1991 | Suzuki et al. ................ | 714/703 |
| 5,150,465 A * | 9/1992 | Bush et al. .................... | 710/14 |
| 5,390,186 A | 2/1995 | Murata et al. | |
| 5,455,934 A | 10/1995 | Holland et al. | |
| 5,479,611 A | 12/1995 | Oyama | |
| 5,845,061 A * | 12/1998 | Miyamoto et al. ............. | 714/4 |
| 5,872,906 A | 2/1999 | Morita et al. | |
| 5,875,484 A | 2/1999 | Neuhard et al. | |
| 6,038,681 A | 3/2000 | Saegusa | |
| 6,282,610 B1 | 8/2001 | Bergsten | |
| 6,446,134 B1 * | 9/2002 | Nakamura ................... | 719/313 |

(Continued)

FOREIGN PATENT DOCUMENTS

EP 1 296 244 A2 8/2002

(Continued)

*Primary Examiner*—Jeffrey Pwu
*Assistant Examiner*—Asghar Bilgrami
(74) *Attorney, Agent, or Firm*—Reed Smith LLP; Stanley P. Fisher, Esq.; Juan Carlos A. Marquez, Esq.

(57) ABSTRACT

A disk array system in accordance with the present invention comprises: a plurality of storage devices in which data is stored; a storage device control unit that controls storage of data in the plurality of storage devices; a connection unit connected to the storage device control unit; a first communication control unit; and a management terminal. The first communication control unit is connected to the storage device control unit via the connection unit, and connected on a first network external to the own disk array system, and transfers file data over the first network. The first communication control unit transfers data to the connection unit, and reads information on a fault occurring in the own disk array system from the plurality of storage devices so as to transfer the information to the management terminal.

According to the present invention, there is provided a disk array system connectable on a plurality of different kinds of networks and a method of controlling fault information concerning the disk array system.

18 Claims, 22 Drawing Sheets

U.S. PATENT DOCUMENTS

| | | |
|---|---|---|
| 6,473,857 B1 | 10/2002 | Panas et al. |
| 6,629,273 B1 | 9/2003 | Patterson |
| 2002/0038436 A1 | 3/2002 | Suzuki |
| 2002/0049886 A1 | 4/2002 | Furuya et al. |
| 2002/0124124 A1 | 9/2002 | Matsumoto et al. |
| 2002/0133735 A1* | 9/2002 | McKean et al. ............... 714/5 |
| 2002/0152339 A1 | 10/2002 | Yamamoto |
| 2002/0156984 A1 | 10/2002 | Padovano |
| 2002/0178143 A1 | 11/2002 | Fujimoto |
| 2002/0188711 A1* | 12/2002 | Meyer et al. ............... 709/223 |
| 2003/0041278 A1 | 2/2003 | Lin |
| 2003/0135782 A1 | 7/2003 | Matsunami et al. |
| 2004/0111485 A1 | 6/2004 | Mimatsu et al. |
| 2004/0153844 A1* | 8/2004 | Ghose et al. ............... 714/42 |

FOREIGN PATENT DOCUMENTS

| | | |
|---|---|---|
| EP | 1 367 481 A2 | 8/2002 |
| JP | 10-149262 | 11/1996 |
| JP | 11-149351 | 11/1997 |
| JP | 11-232047 | 2/1998 |

\* cited by examiner

LU MANAGEMENT TABLE

| LU No. | Physical disk | Storage capacity | RAID level |
|---|---|---|---|
| #1 | #001,#002,#003,#004,#005 | 100GB | 5 |
| #2 | #001,#002,#003,#004,#005 | 300GB | 5 |
| #3 | #006,#007, | 200GB | 1 |
| ⋮ | ⋮ | ⋮ | ⋮ |

METADATA

| Filename | Leading address | Storage capacity | Owner | Time instant of update |
|---|---|---|---|---|
| A | 7BSA | 200MB | X | 0:00 |
| B | 05BF | 50MB | X | 7:57 |
| C | 1F30 | 100MB | Y | 9:15 |
| D | 470B | 100MB | Z | 15:20 |
| ⋮ | ⋮ | ⋮ | ⋮ | ⋮ |

FILE LOCK TABLE

| Filename | Locked or not |
|---|---|
| A | Locked |
| B | - |
| C | - |
| D | Locked |
| ⋮ | ⋮ |

722

LU LOCK TABLE

| LU | Locked or not |
|---|---|
| Common | - |
| 1 | Locked |
| 2 | - |
| ⋮ | ⋮ |

FIG.17

| Slot No. | Channel adapter | System LU No. | Fault information storage LU No. |
|---|---|---|---|
| 1 | CHN ▽ | 112 | 113 |
| 2 | CHN ▽ | 21 | 22 |
| 3 | CHN ▽ | 158 | 159 |
| 4 | CHN ▽ | 72 | 73 |
| 5 | CHF ▽ | 5 | 6 |
| 6 | CHF ▽ | 24 | 25 |
| 7 | CHA ▽ | 60 | 61 |
| 8 | CHA ▽ | 125 | 126 |

LU DEFINITION

OK   Cancel

FIG.18

CLUSTERING

| Group of Power Supplies | Slot No. | Board ID | Type of board | First failover destination | Second failover destination | Common LU |
|---|---|---|---|---|---|---|
| A | 1 | a | CHN | 2 | 3 | 58 |
| B | 2 | b | CHN | 3 | 4 | 58 |
| A | 3 | c | CHN | 4 | 1 | 58 |
| B | 4 | d | CHN | 1 | 2 | 58 |
| A | 5 | e | CHF | 6 | ▷ | 132 |
| B | 6 | f | CHF | 5 | - | 132 |
| A | 7 | g | CHA | 8 | - | 47 |
| B | 8 | h | CHA | 7 | - | 47 |

[Enter] [Cancel]

FIG.23

| No. | CPU | I/O processor | Management terminal | Storage device (system LU) |
|---|---|---|---|---|
| 1 | | | ← Directing dumping (OS log, core dump) | |
| 2 | | Setting flags, which indicate presence of the OS log and core dump, in the communication memory in response to the directive given from the management terminal | | |
| 3 | | ← Notifying that the dumps have been collected | | |
| 4 | Receiving the notification that the dumps have been collected | | | |
| 5 | Reading directed information from the system LU into the memory | ←——————————————— | | |
| 6 | Compress and encrypt the information in the memory | | | |
| 7 | | Transmitting the dumps ——▶ | | |
| 8 | Transmitting the collected information ═══════════════▶ | | | |
| 9 | Notifying that transfer has been completed ——▶ | | | |
| 10 | | Notifying that transfer has been completed | | |
| 11 | | | ——▶ | |
| 12 | | | Transferring it to the center | |

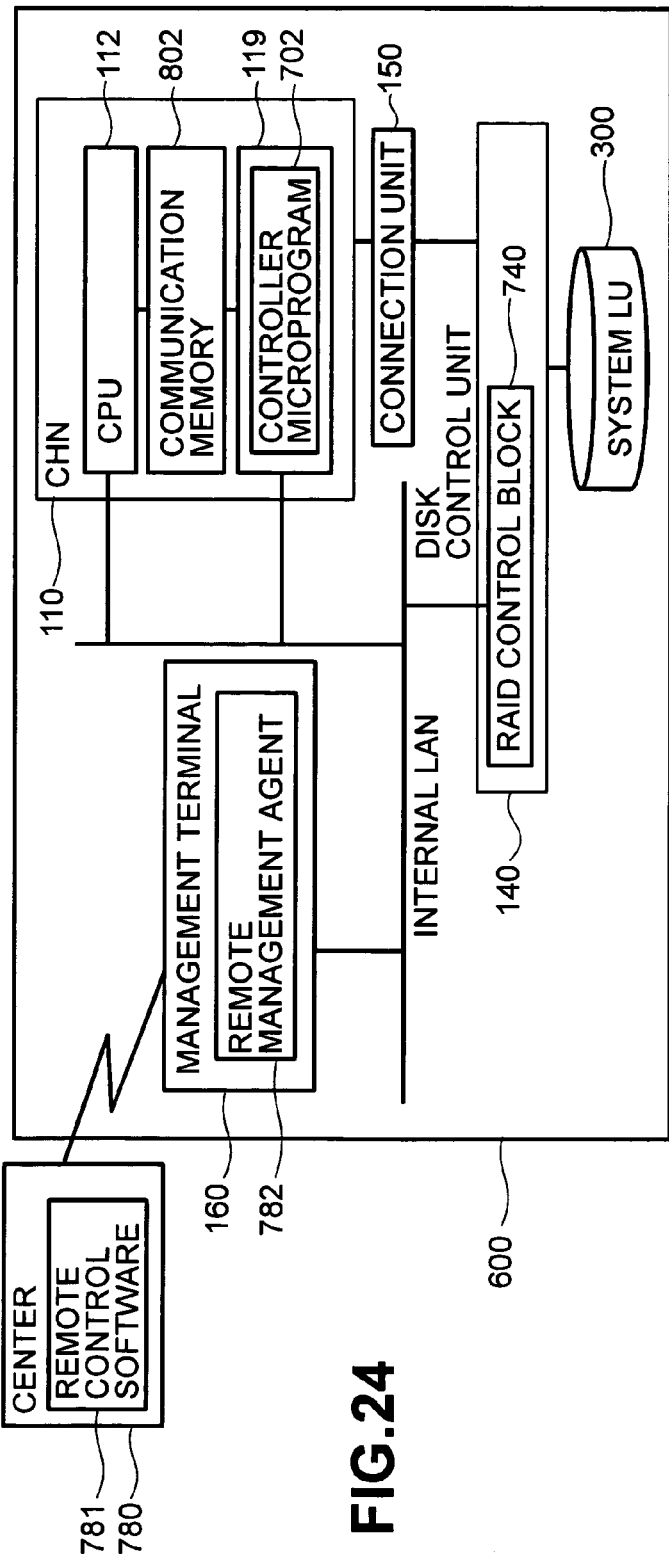

FIG.27

| No. | Second CPU | Second I/O processor | First CPU | First I/O processor | Management terminal | Storage device (fault information storage LU) |
|---|---|---|---|---|---|---|
| 1 | OS in a panic | | | | | |
| 2 | Writing a crash dump in the fault LU | | | | | → |
| 3 | Notifying the second I/O processor of the system crash | → | | | | |
| 4 | HALT | | | | | |
| 5 | | Notifying the first I/O processor of the system crash | → | | | |
| 6 | | | ← | Notifying the first CPU of the system crash | | |
| 7 | | | Reading directed information from the fault LU into the memory | ← | | |
| 8 | | | Compressing and encrypting the information in the memory | | | |
| 9 | | | Transferring the information | → | | |
| 10 | | | Notifying that transfer has been completed | → | | |
| 11 | | | | | Notifying the center that a full dump has been collected | |
| 12 | | | | | Receiving the full dump from the center | | ated fault information concerning the own storage device system, thereby decreasing the load imposed on a processor of the storage device system. Moreover, a processor included in the communication control unit reads fault information, whereby a management terminal can collect detailed information to be utilized to identify the cause of a fault.

DISK ARRAY SYSTEM AND FAULT INFORMATION CONTROL METHOD

CROSS REFERENCE TO RELATED APPLICATION

This specification cites Patent Application No. 2003-302303 that is the basis of the present application and filed in Japan on Aug. 27, 2003, Patent Applications Nos. 2003-11592, 2003-11594, 2003-11595, 2003-11593, and 2003-11591 filed in Japan on Jan. 20, 2003, Patent Application No. 2003-15525 filed in Japan on Jan. 24, 2003, and patent application Ser. No. 09/829,470 filed in the U.S. on Apr. 9, 2001.

BACKGROUND OF THE INVENTION

1. Field of the Invention

The present invention relates to a storage device system connectable on a plurality of different kinds of networks, and a method for controlling fault information concerning the storage device system.

2. Description of the Related Art

In recent years, an amount of data dealt with in a computer system has rapidly increased. In order to efficiently utilize and manage a mass of data, a technology has been developed for connecting a plurality of disk array systems (hereinafter storage device systems) to information processing units over a leased network (storage area network (SAN)), and for realizing fast access to a large amount of data stored in the storage device systems. For the connection of the storage device systems to the information processing units over the SAN and the realization of fast data transfer, it is a matter of common practice to construct a network using communication equipment conformable to a Fibre Channel protocol.

On the other hand, a network system called a network attached storage (NAS) has been developed in efforts to realize access on a file level to a storage device system while interconnecting a plurality of storage device systems and information processing units over a network conformable to the transmission control protocol/Internet protocol (TCP/IP). In the NAS, a device having a facility of a file system is connected to each of the storage device systems. Therefore, the information processing units can access the storage device systems on a file level. In particular, a large-scale NAS that is managed in the redundant arrays of inexpensive disks (RAID) mode and provides an enormous storage resource called a midrange-class or enterprise-class resource is attracting notice these days.

However, the conventional NAS is realized by connecting information processing units, which have the ability to communication data according to the TCP/IP and a facility of a file system, to storage device systems devoid of the ability to communication data according to the TCP/IP and the facility of the file system. A space where the information processing units are installed is therefore needed. Moreover, the information processing units and storage device systems are usually interconnected over the SAN because of the necessity of fast communications. Therefore, dedicated communication control equipment and communication control facilities are needed.

SUMMARY OF THE INVENTION

The present invention attempts to break through the foregoing situation. An object of the present invention is to provide a novel storage device system connectable to a plurality of different kinds of networks, a storage device control unit needed to invent such a storage device system, and a method for controlling fault information concerning the device control unit.

Another object of the present invention is to efficiently control fault information concerning a storage device system, which is connectable on a plurality of different kinds of networks, by utilizing a plurality of processors. The plurality of processors includes: a processor having a facility of a file system for transferring information on a file level to or from an external information communication unit; and a processor that controls writing or reading of data in or from storage devices on a data block level in response to a request made by the processor having the facility of the file system.

In order to accomplish the above objects, the present invention includes means described below.

A disk array system in accordance with the present invention comprises: a plurality of storage devices in which data is stored; a storage device control unit that controls storage of data in the plurality of storage devices; a connection unit connected to the storage device control unit; a first communication control unit; a second communication control unit; and a management terminal.

The first communication control unit and second communication control unit are referred to as, for example, channel directors, channel adapters, or channel control units. The first communication control unit is connected to the storage device control unit-via the connection unit, also connected on a first network external to the own disk array system, and transfers file data over the first network. The first communication control unit includes a first processor that associates file data, which is transferred over the first network, with a block of data stored in the storage device control unit. Furthermore, the first communication control unit includes a second processor that transfers data in response to a request made by the first processor. Moreover, the second processor reads information on a fault occurring in the own disk array system from the plurality of storage devices in response to a request made by the first processor, and transmits the information to the first processor.

The second communication control unit is connected to the storage device control unit via the connection unit, also connected on a second network external to the own disk array system, and transfers file data over the second network. The second communication control unit includes a third processor that associates file data, which is transferred over the second network, with block-form data stored in the storage device control unit. Furthermore, the second communication control unit includes a fourth processor that transfers data in response to a request made by the third processor. The fourth processor also transfers information on a fault occurring in the third processor to the storage device control unit in response to a request made by the third processor.

The storage device control unit is referred to as, for example, a disk director, disk adapter, or disk control unit. The connection unit is realized with, for example, a bus, a switch, a network such as a LAN, or any other connection device. The first network is, for example, a LAN.

The management terminal is connected to the first communication control unit and makes a request to the second processor for information on a fault occurring in the disk array system. The management terminal is referred to as, for example, a service processor.

According to the present invention, there are provided a novel storage device system connectable on a plurality of kinds of networks, a storage device control unit needed to invent such a storage device system, and a method for controlling fault information concerning the device control unit.

Furthermore, according to the present invention, fault information concerning a storage device system connectable on a plurality of kinds of networks can be controlled efficiently by utilizing a plurality of processors. The plurality of processors includes: a processor that has a facility of a file system for transferring information on a file level to or from an external information communication unit, and a processor that controls writing or reading of data in or from storage devices on a data block level in response to a request made by the processor having the facility of the file system.

BRIEF DESCRIPTION OF THE DRAWINGS

Preferred embodiments of the present invention will be described in conjunction with the accompanying drawings, in which:

FIG. 4 shows an LU management table employed in the embodiment of the present invention;

FIG. 9 shows metadata employed in the embodiment of the present invention;

FIG. 10 shows lock data employed in the embodiment of the present invention;

FIG. 17 is an example of a screen image displayed on an output device included in a management terminal and used for installation according to the embodiment of the present invention;

FIG. 18 shows an example of a screen image displayed on an information processing unit and used to determine a cluster according to the embodiment of the present invention;

FIG. 23 is a flowchart describing a process of collecting an OS log or a CORE dump concerning the storage device system in accordance with the embodiment of the present invention;

FIG. 24 shows the configuration for collecting a register dump concerning the storage device system in accordance with the embodiment of the present invention;

FIG. 25 is a flowchart describing a process of collecting a register dump concerning the storage device system in accordance with the embodiment of the present invention;

FIG. 27 is a flowchart describing a process of collecting a full dump concerning the storage device system in accordance with the embodiment of the present invention.

DESCRIPTION OF THE PREFERRED EMBODIMENTS

An embodiment of the present invention will be described in conjunction with the drawings below.

Figure 1:
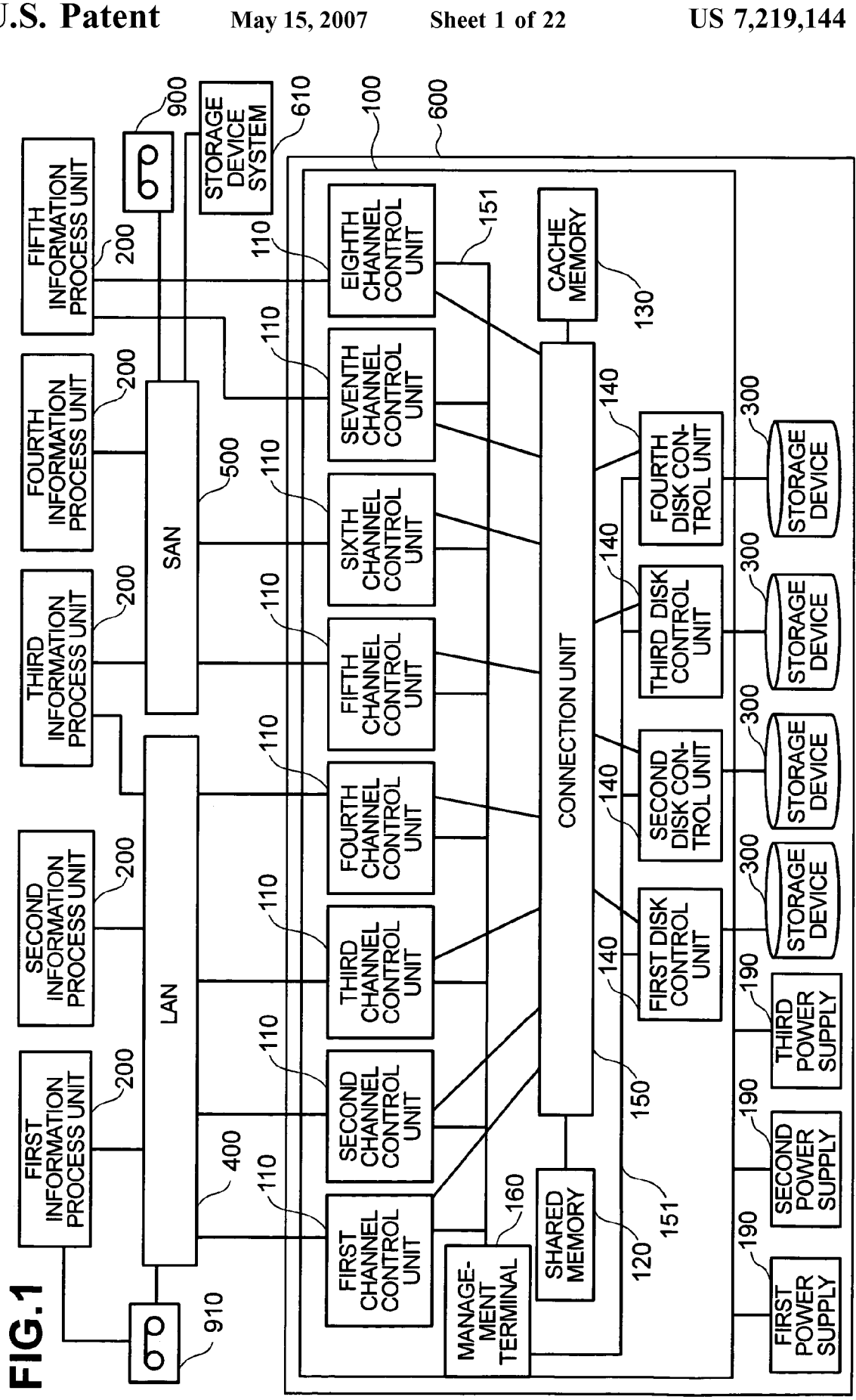
FIG. 1 is a block diagram showing the overall configuration of a storage device system in accordance with an embodiment of the present invention.

FIG. 1 is a block diagram showing the overall configuration of a storage device system in accordance with the embodiment.

(Overall Configuration)

A storage device system 600 comprises a storage device controller 100 and storage devices 300. The storage device controller 100 controls the storage devices 300 according to commands received from respective information processing units 200. For example, a data input/output request is received from any information processing unit 200, and data stored in the storage devices 300 is received or transmitted. Data is stored in a logical volume (hereinafter, a logical unit (LU)) that is a storage area logically defined in a physical storage area provided by a disk drive included in each of the storage devices 300. Moreover, the storage device controller 100 transfers various commands, which are used to manage the storage device system 600, to or from the information processing units 200.

Power supplies 190 supply power to the storage device system 600. The power supplies 190 are formed with storage batteries connected to an external power supply. A plurality of storage batteries is incorporated in the storage device system in order to realize redundancy. More particularly, the storage device system 600 is physically divided into two or more power supply groups in terms of power supply. For example, when the storage device system 600 is divided into two power supply groups, the first to fourth channel control units 110 belong to the first power supply group, and the fifth to eighth channel control units 110 belong to the second power supply group. Components of all kinds adopting the redundant configuration belong to either of the two or more power supply groups. Moreover, redundant components of each kind do not belong to the same power supply group. Moreover, the power supplies 190 are also divided in to two or more groups. Each of the two or more groups of power supplies 190 receives power from the external power supply over an independent cable. Each of the two or more groups of power supplies 190 supplies power to the power supply group associated therewith. Each of the two or more groups of power supplies 190 is composed of a plurality of power supplies. Since the storage device system 600 has redundancy, even if a certain power supply fails, the storage device system 600 can be kept operated. Even if external power supply to the two or more groups of power supplies 190 is discontinued, the storage device system can be kept operated.

The information processing units 200 are realized with computers each having a central processing unit (CPU) and a memory. The CPU incorporated in each information processing unit 200 runs various programs, whereby diverse capabilities are realized. The information processing units 200 may be, for example, personal computers or workstations, or mainframe computers.

Referring to FIG. 1, the first to third information processing units 200 are connected to the storage device controller 100 over a local area network (LAN) 400. The LAN 400 may be the Internet or a leased network. The first to third information processing units 200 and the storage device controller 100 communicate with one another over the LAN 400 according to, for example, the TCP/IP. The first to third information processing units 200 transmit a data access request, which specifies a filename (a data input/output request made in units of a file, hereinafter, a file access request), to the storage device system 600.

A backup device 910 is connected to the LAN 400. Specifically, the backup device 910 is a disk device such as a magnetooptical disk or DVD-RAM or a tape device such as a DAT tape, a cassette tape, an open tape, or a cartridge tape. The backup device 910 communicates with the storage device controller 100 over the LAN 400, whereby backup data of data stored in the storage devices 300 is stored in the backup device 910. Moreover, the backup device 910 may be connected to the first information processing unit 200. In this case, backup data of data stored in the storage devices 300 is acquired via the first information processing unit 200.

The storage device controller 100 includes first to fourth channel control units 110. The storage device controller 100 receives file access requests sent from the first to third respective information processing units 200 via the first to fourth channel control units 110. Specifically, network addresses (for example, IP addresses) on the LAN 400 are assigned to the first to fourth respective channel control units 110. The first to fourth channel control units 110 behave like network-attached storage (NAS) devices, and can provide NAS services to the first to third information processing units 200 as if independent NAS devices were present. Hereinafter, CHN110 will denote the first to fourth channel control units 110. The one storage device system 600 includes the first to fourth channel control units 110 that provides NAS services independently of one another. Consequently, NAS servers that are conventionally realized with independent computers are integrated into the one storage device system 600. Eventually, the storage device system 600 can be managed on a centralized basis, and maintenance jobs including determination or control of various settings, management of service lives, and management of versions can be achieved efficiently.

Power is supplied from the power supplies 190 to the channel control units 110 via the storage device controller 100. The channel control units 110 can be physically removed from the storage device controller 100. Therefore, when the channel control units 110 are physically removed from the storage device controller 100, power supply to the channel control units 110 is discontinued. Moreover, when the channel control units 110 are incorporated in the storage device controller 100, power supply to the channel control units 110 is enabled. Each of the channel control units 110 includes a power circuit. When the power circuit is controlled by running a program that involves a plurality of LSIs mounted in the channel control unit 110, whereby power supply to each component of the channel control unit 110 can be started or discontinued.

Incidentally, each of the first to fourth channel control units 110 included in the storage device controller 100 employed in the present invention is realized with hardware formed as an integrated unit on a circuit board, and software such as an operating system (OS) to be run in the hardware and an application program to be run on the OS or an object code executable by the hardware. Thus, the storage device system 600 in accordance with the present embodiment has facilities, which are conventionally realized with part of hardware, realized by software. Therefore, the storage device system 600 in accordance with the present embodiment can be operated flexibly and can provide services that meet diverse and drastically changing users' needs.

The third and fourth information processing units 200 are connected to the storage device controller 100 via a storage area network (SAN) 500. The SAN 500 is a network over which data is transferred among the storage device controller 100 and the third and fourth information processing units 200 in units of a block in which data in a storage area provided by each storage device 300 is managed. The communications among the third and fourth information processing units 200 and the storage device controller 100 over the SAN 500 are generally performed according to a Fibre Channel protocol. The third and fourth information processing units transmit a data access request, which requests access to data in units of a block (hereinafter, a block access request), according to the Fibre Channel protocol.

A backup device 900 compatible with SANs is connected on the SAN 500. The SAN-compatible backup device 900 communicates with the storage device controller 100 over the SAN 500, whereby backup data of data stored in the storage devices 300 is stored in the backup device 900.

The fifth information processing unit 200 is connected to the storage device controller 100 without the intervention of the LAN 400, SAN 500, or any other network. The fifth information processing unit 200 may be formed with, for example, a mainframe computer. The fifth information processing unit 200 and storage device controller 100 communicate with each other according to a communications protocol, for example, the Fibre connectivity (FICON)® protocol, enterprise system connection (ESCON)® protocol, advanced connection architecture (ACONARC)® protocol, or Fibre connection architecture (FIBARC)® protocol. The fifth information processing unit 500 transmits a block access request to the storage device system 600 according to any of the above protocols.

In the storage device controller 100, the seventh or eighth channel control unit 110 communicate with the fifth information processing unit 200. Hereinafter, CHA110 will denote the seventh and eight channel control units 110.

Other storage device system 610 installed in a remote place (secondary site) away from the place (primary site) where the storage device system 600 is installed is connected on the SAN 500. The storage device system 610 is utilized as a system to which data is copied by a replication or remote copy facility that will be described later. Incidentally, the storage device system 610 may be connected to the storage device system 600 over an asynchronous transfer mode (ATM) communication link or the like other than the SAN 500. In this case, for example, channel control units 110 each including an interface (channel extender) via which the communication link is utilized are adopted as the channel control units 110.

(Storage Device)

The storage devices 300 include numerous disk drives (physical disks) and provide the information processing units 200 with storage areas. Data is stored in a logical unit (LU) that is a storage area logically defined in a physical storage area provided by each disk drive. As the disk drive, for example, a hard disk drive, a flexible disk drive, a semiconductor storage device, or the like can be adopted. Incidentally, the storage devices 300 may be constructed as a disk array composed of a plurality of disk drives. In this case, the storage areas provided for the information processing units 200 may be realized with a plurality of disk drives managed in the redundant array of independent (or inexpensive) disks (RAID) mode.

The storage device controller 100 and storage devices 300 may be, as shown in FIG. 1, connected directly to one another or may be connected to one another over a network. Furthermore, the storage devices 300 may be constructed as integral parts of the storage device controller 100.

Logical units (LUs) defined in the storage devices 300 include user LUs accessible by the information processing units 200 and system LUs to be used to control the channel control units 110. An OS to be run in the channel control units CHN110 is stored in the system LUs. Moreover, the LUs in the storage devices 300 are associated with the channel control units 110. Consequently, accessible LUs are allocated to the respective channel control units 110. Moreover, the plurality of channel control units 110 may share one LU. Hereinafter, the user LUs and system LUs may be referred to as user disks and system disks respectively.

(Storage Device Controller)

The storage device controller 100 comprises the channel control units 110, a common memory 120, a cache memory 130, disk control units 140, a management terminal 160, and a connection unit 150.

Each of the channel control units 110 includes a communication interface via which the channel control unit communicates with the information processing units 200. Each channel control unit 110 has the ability to transfer a data input/output command or the like to or from the information processing units 200. For example, each of the channel control units CHN110 receives a file access request sent from any of the first to third information processing units 200. In this case, the storage device system 600 provides the first to third information processing units 200 with NAS services. Moreover, each of the channel control units CHF110 that are the fifth and sixth channel control units 110 receives a block access request that is sent from either of the third and fourth information processing units (200) according to a Fibre Channel protocol. In this case, the storage device system 600 provides the third and fourth information processing units 200 with a fast accessible data storage service. Moreover, the channel control units CHA110 receive a block access request that is sent from the fifth information processing unit 200 according to the FICON, ESCON, ACONARC, or FIBERC protocol. In this case, the storage device system 600 provides the mainframe computer such as the fifth information processing unit 200 with a data storage service.

The channel control units 100 are connected to the management terminal 160 over an internal LAN 151 or any other communication network. Consequently, a microprogram or the like to be run in the channel control units 110 can be transmitted from the management terminal 160 and installed therein. The configuration of each channel control unit 110 will be described later.

The connection unit 150 is connected to the channel control units 110, common memory 120, cache memory 130, and disk control units 140. Data and commands are transferred among the channel control units 110, common memory 120, cache memory 130, and disk control units 140 via the connection unit 150. The connection unit 150 is formed with a switch, for example, a super-high-speed crossbar switch that switches connections at a high speed so as to enable data transfer, or a bus. Since the channel control units 110 are connected to one another via the switch, the efficiency in communication among the channel control units 110 has greatly improved compared with a conventional configuration that NAS servers realized with individual computers are connected to one another over a LAN. This enables fast file sharing or fast failover.

The common memory 120 and cache memory 130 are memories shared by the channel control units 110 and disk control units 140. The common memory 120 is used mainly to store control information or commands, while the cache memory 130 is used mainly to store data.

For example, if a data input/output command a certain channel control unit 110 has received from a certain information processing unit 200 is a Write command, the channel control unit 110 writes the Write command in the common memory 120, and writes data, which is to be written and is received from the information processing unit 200, in the cache memory 130. On the other hand, the disk control units 140 monitor the common memory 120. When the fact that the Write command is written in the common memory 120 is detected, the data to be written is read from the cache memory 130 in response to the command, and written in the storage devices 300. Moreover, for example, if a data input/output command a certain channel control unit 110 has received from a certain information processing unit 200 is a Read command, the channel control unit 110 writes the Read command in the common memory 120. Moreover, the channel control unit 110 reads data, which the information processing unit 200 has requested with the Read command, from the cache memory 130. Assuming that data requested with the Read command is not written in the cache memory 130, the channel control unit 110 or any disk control unit 140 read the data, which is requested with the Read command, from the associated storage device 300, and write the data in the cache memory 130.

According to the present embodiment, the common memory 120 and cache memory 130 are included independently of the channel control units 110 and disk control units 140. The present invention is not limited to this mode. Alternatively, the common memory 120 or cache memory 130 may be divided into portions, and the portions may be incorporated in the respective channel control units 110 and disk control units 140. In this case, the connection unit 150 connects the channel control units 110 and disk control units 140 which include the divided portions of the common memory or cache memory.

The disk control units 140 control the storage devices 300. For example, as mentioned above, each of the disk control units 140 write data in the storage devices 300 in response to a Data Write command a certain channel control unit 110 has received from a certain information processing unit 200. Moreover, each of the disk control units 140 converts a data access request, which specifies a logical address assigned to an LU and is sent from a certain channel control unit 110, into a data access request that specifies a physical address in a physical disk. If the physical disks included in the storage devices 300 are managed in the RAID mode, data is accessed according to the RAID level. The disk control units 140 control management of a copy of data stored in the storage devices 300 and control backup of the data. Furthermore, the disk control units 140 extend control to store a copy of data stored in the storage device system 600 installed at the primary site into the storage device system 610 installed at the secondary site (replication or remote copy). This is intended to prevent loss of data in case of a disaster (disaster recovery).

The disk control units 140 and the management terminal 160 are interconnected over a communication network such as the internal LAN 151, and can communicate with one another. Consequently, a microprogram or the like to be run in the disk control units 140 can be transmitted from the management terminal 160 and installed in the disk control units 140. The configuration of each of the disk control units 140 will be described later.

(Management Terminal)

The management terminal 160 is formed with a computer that maintains or manages the storage device system 600. By handling the management terminal 160, the arrangement of the physical disks included in the storage devices 300 can be determined, the LUs can be defined, and a microprogram to be run in the channel control units 110 can be installed. When the arrangement of the physical disks included in the storage devices 300 is determined, for example, the number of physical disks can be increased or decreased, or the RAID level can be modified (the levels of the RAID can be changed from level 1 to level 5). Furthermore, the management terminal 160 can be used to check the operating state of the storage device system 600, specify a failing region in the storage device system 600, and install an OS in the channel control units 110. Moreover, the management terminal 160 is connected to an external maintenance center over a LAN or a telephone line. The management terminal 160 can therefore be used to monitor the storage device system 600 for a fault or to cope with a fault immediately if the fault occurs. Occurrence of a fault is notified by, for example, an OS, an application program, or driver software. The notification is achieved according to the HTTP protocol or simple network management protocol (SNMP) or by e-mail. The determination of settings or extension of control is achieved using a Web page that is provided by a Web server realized with server software running in the management terminal 160. The Web page is used as a user interface by an operator. The operator or the like handles the management terminal 160 so as to determine an object of fault monitoring or the contents thereof or to determine a destination of fault notification.

The management terminal 160 may be incorporated in the storage device controller 100 or may be formed as an external stand-alone device. Moreover, the managemtne terminal 160 may be realized with a computer dedicated to maintenance and management of the storage device controller 100 and storage devices 300 or may be realized with a general-purpose computer having a maintenance and management capability.

Figures 2, 3:
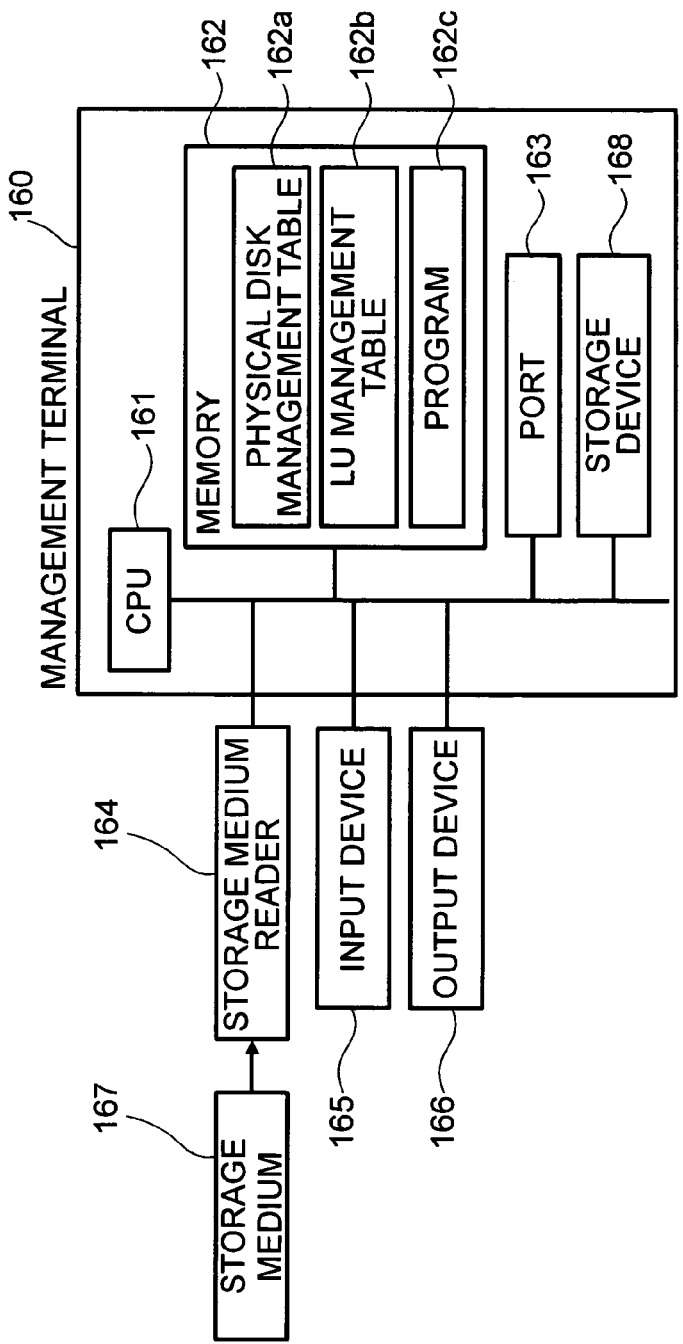
FIG. 2 is a block diagram showing the configuration of a management terminal employed in the embodiment of the present invention.
FIG. 3 shows a physical disk management table employed in the embodiment of the present invention.

FIG. 2 is a block diagram showing the configuration of the management terminal 160.

The management terminal 160 comprises a CPU 161, a memory 162, a port 163, a recording medium reader 164, an input device 165, an output device 166, and a storage device 168.

The CPU 161 is responsible for control of the entire management terminal 160. The management terminal 160 exerts the capability of a Web server when it runs a program 162c stored in the memory 162. A physical disk management table 162a, an LU management table 162b, and the program 162c are stored in the memory 162.

The physical disk management table 162a is a table used to manage the physical disks (disk drives) included in the storage devices 300. FIG. 3 shows the physical disk management table 162a. In FIG. 3, disks having disk numbers 001 to 006 are listed out of numerous physical disks included in the storage devices 300. Relative to each physical disk, a storage capacity, a RAID level, and a use situation are specified.

The LU management table 162b is a table used to manage the LUs logically defined in the physical disks. FIG. 4 shows the LU management table 162b. In FIG. 4, LUs having LU numbers 1 to 3 are listed out of the numerous LUs defined in the storage devices 300. Relative to each LU, a physical disk number, a storage capacity, and a RAID level are specified.

The recording medium reader 164 is a device for reading a program or data from a recording medium 167. The read program or data is stored in the memory 162 or storage device 168. Consequently, for example, the program 162c recorded in the recording medium 167 can be read from the recording medium 167 using the recording medium reader 164, and stored in the memory 162 or storage device 168. The recording medium 167 may be a flexible disk, a CD-ROM, or a semiconductor memory. The recording medium reader 162 may be incorporated in the management terminal 160. The storage device 168 is, for example, a hard disk drive, a flexible disk drive, or a semiconductor storage device. An operator or the like uses the input device 165 to enter data at the management terminal 160. As the input device 165, for example, a keyboard and a mouse are adopted. The output device 166 is a device used to transmit information outside. As the output device 166, for example, a display or a printer is adopted. The port 163 is connected on the internal LAN 151. This permits the management terminal 160 to communicate with the channel control units 110 or disk control units 140. Moreover, the port 163 may be connected on the LAN 400 or a telephone line.

As described in conjunction with FIG. 1, the management terminal 160 is connected to the power supplies 190 and power is supplied from the power supplies 190 to the management terminal 160.

(Appearance)

Figure 5:
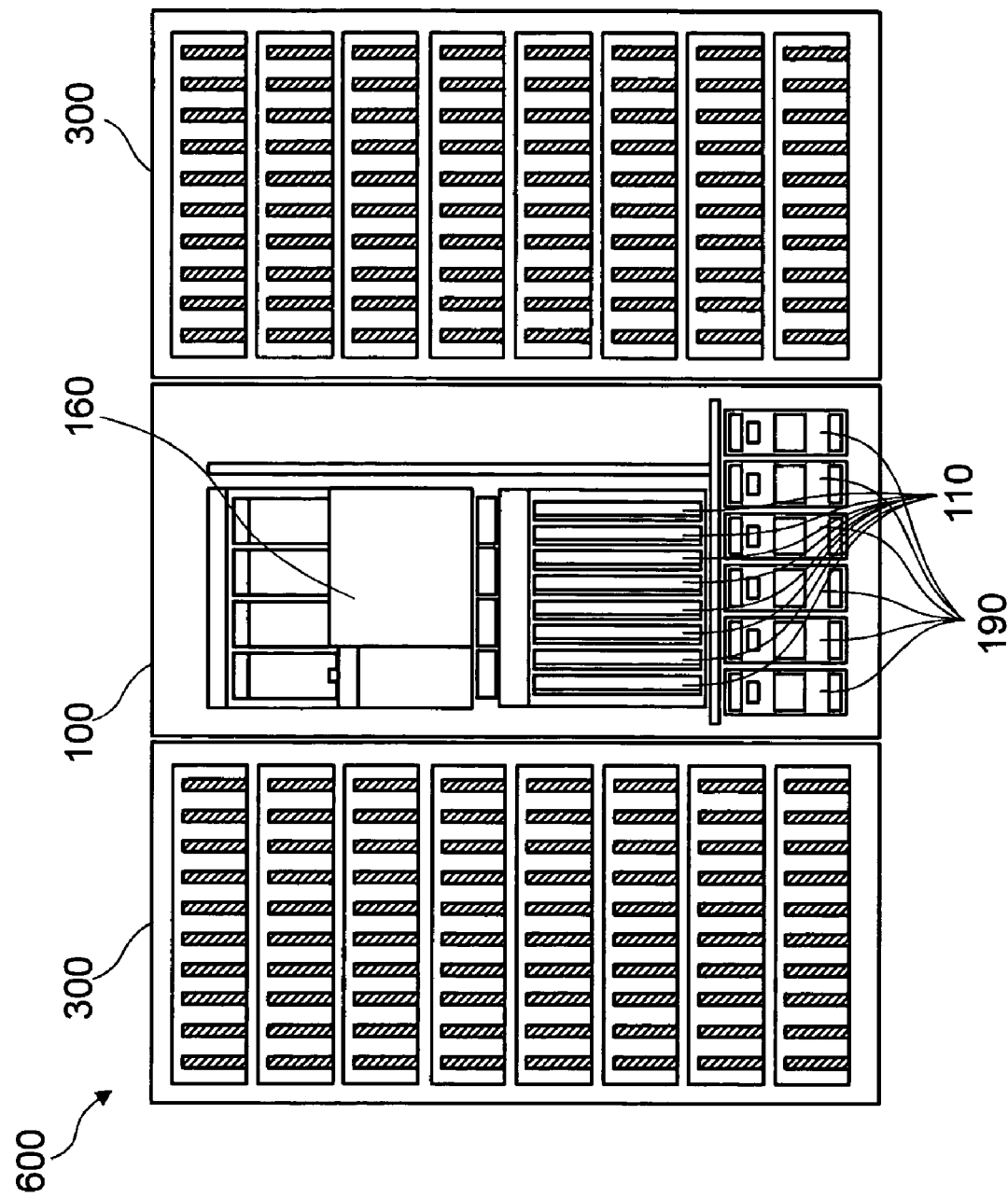
FIG. 5 shows the appearance of the storage device system in accordance with the embodiment of the present invention.
Figure 6:
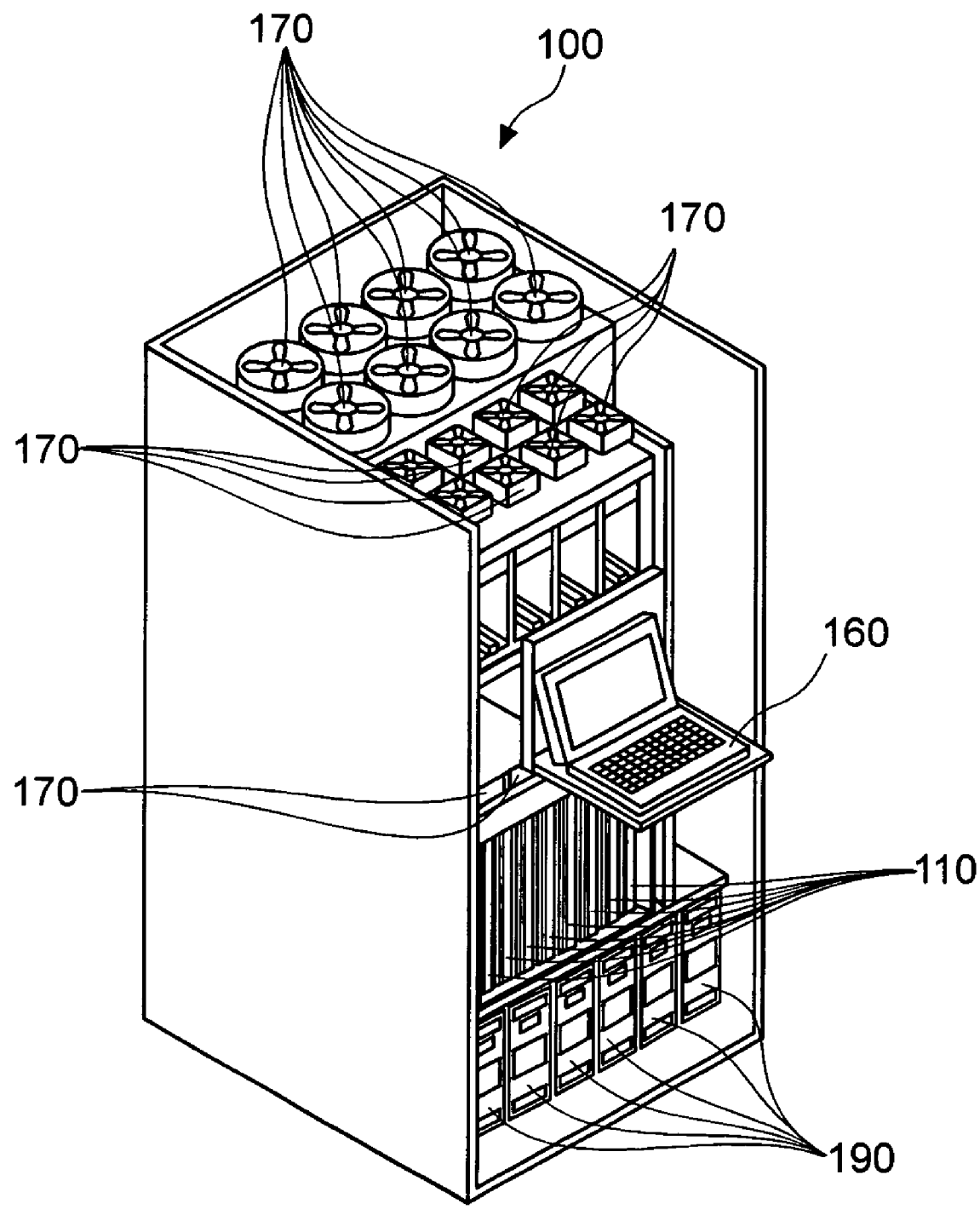
FIG. 6 shows the appearance of a storage device control unit employed in the embodiment of the present invention.

FIG. 5 shows the appearance of the storage device system 600 in accordance with the present embodiment. FIG. 6 shows the appearance of the storage device controller 100.

As shown in FIG. 5, the storage device system 600 in accordance with the present embodiment has the storage device controller 100 and storage devices 300 encased in respective housings. The housings of the storage devices 300 are placed on both the sides of the housing of the storage device controller 100.

The storage device controller 100 has the management terminal 160 installed in the center on the face thereof. The management terminal 160 is blocked with a cover. As shown in FIG. 6, when the cover is opened, the management terminal 160 becomes usable. The management terminal 160 shown in FIG. 6 is realized with a so-called notebook personal computer but may be realized with any type of computer.

Slots in which the channel control units 110 are loaded are formed below the management terminal 160. A circuit board realizing each channel control unit 110 is loaded in each slot. In the storage device system 600 in accordance with the present embodiment, for example, eight slots are formed. A guide rail is, as shown in FIG. 5 and FIG. 6, laid down in each of the eight slots in order to help load the channel control units 110. By inserting each channel control unit 110 into the slot along the guide rail, the channel control unit 110 is mounted in the storage device controller 100. Moreover, the channel control unit 110 loaded in each slot is removed when pulled forward along the guide rail. A connector via which each channel control unit 110 is electrically connected to the storage device controller 100 is formed on the front side in the depth direction of each slot. The channel control units 110 are grouped into the channel control units CHN110, channel control units CHF110, and channel control unit CHA110. However, since the channel control units 110 are interchangeable with one another in terms of the size, the position of the connector, and the pin configuration of the connector, any of the channel control units 110 can be loaded in any of the eight slots. Consequently, for example, the channel control units CHN110 may be loaded in all of the eight slots. Moreover, for example, as shown in FIG. 1, the four channel control units CHN110, two channel control units CHF110, and two channel control units CHA110 may be loaded in the eight slots. Moreover, any of the slots may have no channel control unit 110 loaded therein.

As mentioned above, the channel control units 110 are provided as circuit boards capable of being loaded in the respective slots, that is, as identical units. Alternatively, each unit may be composed of a plurality of circuit boards. Namely, even if the unit is composed of a plurality of circuit boards, as long as the circuit boards are interconnected, formed as one united body, and loaded in each slot of the storage device controller 100, the unit is considered as one circuit board.

FIG. 5 and FIG. 6 do not show other components of the storage device controller 100 including the disk control units 140 and common memory 120. The components are mounded on the back of the storage device controller 100.

Moreover, the storage device controller 100 includes fans 170 that are used to release heat dissipated from the channel control units 110. The fans 170 are disposed not only on the top of the storage device controller 100 but also above the slots for the channel control units 110.

As the storage device controller 100 and storage devices 300 that are encased in the housings, for example, conventional devices commercialized as SAN products may be utilized. When the connectors of the channel control units CHN are designed to be joined with the connectors formed in the conventional housing as they are, the conventional devices can be readily utilized. Namely, the storage device system 600 of the present embodiment can be readily constructed by utilizing existing products.

According to the present embodiment, the channel control units CHN110, CHF110, and CHA110 coexist in the storage device system 600. Consequently, the storage device system connectable on different kinds of networks can be realized. Specifically, the storage device system 600 is a SAN-NAS integrated storage system capable of being connected on the LAN 140 using the channel control units CHN110 and being connected on the SAN 500 using the channel control units CHF110.

(Channel Control Unit)

The storage device system 600 in accordance with the present embodiment receives a file access request from any of the first to third information processing units 200 using any of the channel control units CHN110, and thus provides the first to third information processing units 200 with NAS services.

Figure 7:
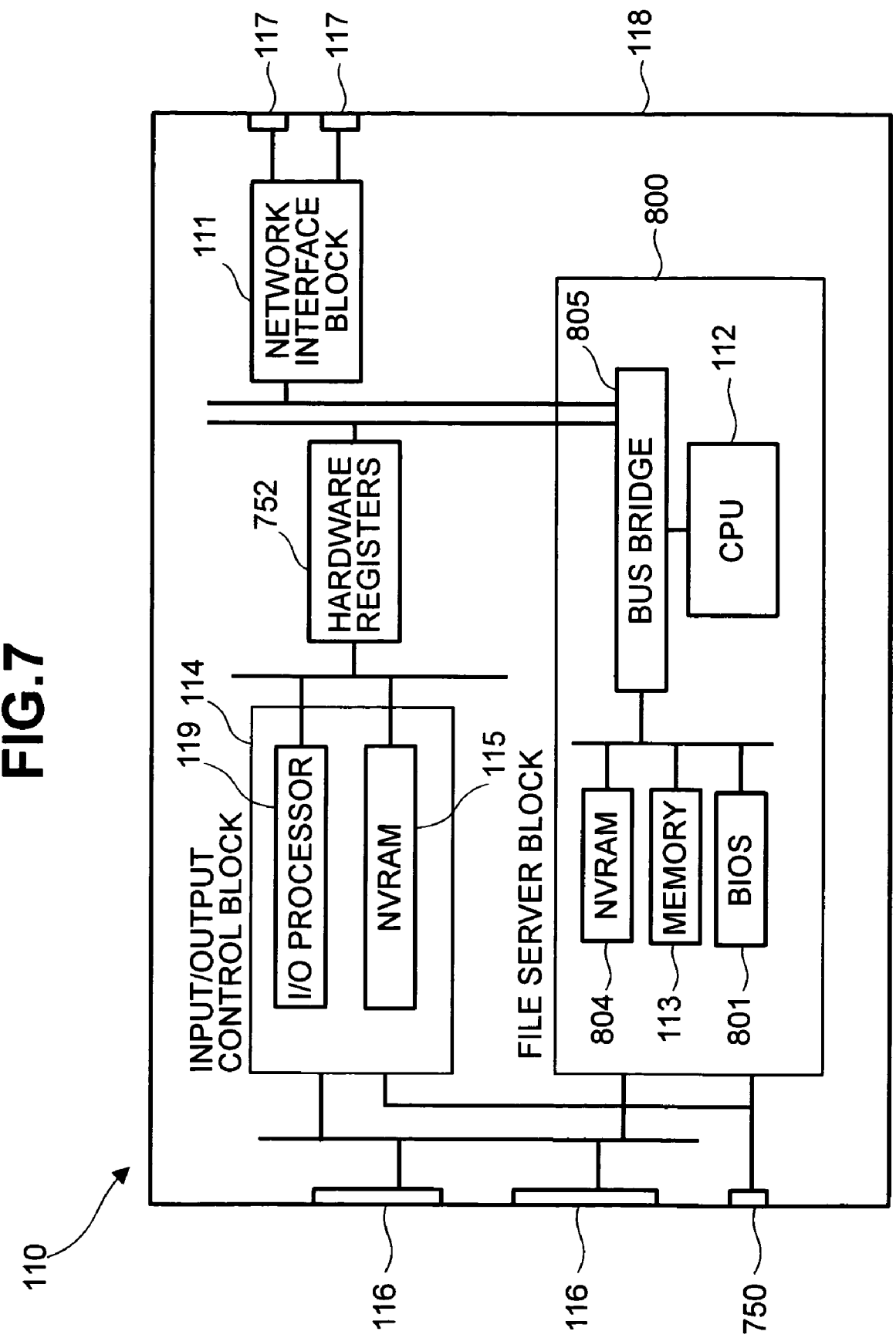
FIG. 7 shows the hardware configuration of a channel control unit CHN employed in the embodiment of the present invention.

FIG. 7 shows the hardware configuration of each channel control unit CHN110. As illustrated, the hardware of each channel control unit CHN110 is one unit. The unit shall be referred to as a NAS board. The NAS board is formed with one circuit board or composed of a plurality of circuit boards. More particularly, the NAS board includes a network interface block 111, an input/output control block 114, a board connection connector 116, a communication connector 117, and a file server block 800 which are integrated into one unit. The input/output control block 114 includes a nonvolatile RAM (NVRAM) 115 and an input/output (I/O) processor 119.

Once each channel control unit CHN110 is loaded in the slot formed in the storage device controller 100, the channel control unit CHN110 and the management terminal 160 are interconnected over a communication network such as the internal LAN 151 via the board connection connector 116.

Power is supplied from the power supplies 190 incorporated in the storage device system 600 to each channel control unit CHN110 via the power supply connector 750. A power control circuit 751 and a hardware register 752 that controls the power control circuit 751 are mounted on each channel control unit CHN110. Values are set or programmed in the hardware register, whereby power supply to the input/output control block 114 and file server block 800 can be started or discontinued. Aside from power control, that is, aside from start or discontinuation of power supply, actions of hardware such as rebooting of the input/output control block 114 or file server block 800 or transition to diagnostic mode can be controlled by modifying the values set in the hardware register 752. Consequently, the I/O processor 119 included in the input/output control block can control the start or discontinuation of power supply to the CPU 112 in the file server block 800, rebooting, and transition to the diagnostic mode on a hardware basis. Moreover, the CPU 112 in the file server block 800 may control the start or discontinuation of power supply to the I/O processor 119 in the input/output control block, rebooting, and transition to the diagnostic mode on the hardware basis.

The network interface block 111 includes a communication interface via which each channel control unit CHN110 communicates with the information processing units 200. The network interface block 111 included in each channel control unit CHN110 receives a file access request that is sent from any of the information processing units 200 according to, for example, the TCP/IP. The communication connector 117 is a connector via which each channel control unit CHN110 communicates with the information processing units 200. The communication connector 117 included in each channel control unit CHN110 is connectable on the LAN 400 and designed for, for example, the Ethernet®.

Incidentally, since the network interface block 111 is an interface helping a user transfer information, it is not preferred that the network interface block 111 is used for maintenance. Consequently, the management terminal 160 to be used mainly for maintenance is connected to each channel control unit 110 via the board connection connector 116 over the internal LAN but not via the network interface block 111.

The file server block 800 comprises the CPU 112, a memory 113, a bus bridge 805, a basic input/output system (BIOS) 801, and a nonvolatile RAM (NVRAM) 804. The CPU 112 is responsible for control to be extended for helping the channel control unit CHN110 act as a NAS board. The CPU 112 controls a file sharing protocol to be adopted for the network file system (NFS) or common Internet file system (CIFS), and the TCP/IP, and analyzes a file access request that specifies a file. Moreover, the CPU 112 uses a conversion table (not shown) stored in the memory 113 to associate data, which is treated in units of a file, with data stored in an associated one of the LUs defined in the storage devices 300. Moreover, the CPU 112 uses the conversion table to associate data, which is communicated to any of the information processing units 200 and treated in units of a file, with data that is written or read in or from an associated one of the storage devices and treated in units of a block, and to convert a file into a block or vice versa. Moreover, the CPU 112 produces a data writing or reading request that specifies any of the LUs defined in the storage devices, and transmits the data writing/reading request to the I/O processor 119. The BIOS 801 is software that, for example, when the power supply of the channel control unit CHN110 is turned on, is first loaded in the memory 113 in the course of activating the CPU 112 and then run. The BIOS 801 is preserved in, for example, a nonvolatile medium such as a flash memory, and installed in the channel control unit CHN110. The CPU 112 runs software read as part of the BIOS 801 in the memory 113, and thus initializes or diagnoses the components of the channel control unit CHN110 relevant to the CPU 112. Furthermore, the CPU 112 issues a command or directive to the I/O processor 119 within the BIOS 801. Thus, a predetermined program, for example, a bootstrap for booting an OS can be read from an associated one of the storage devices 300 to the memory 113. The read bootstrap for booting an OS is executed, whereby a major portion of an OS stored in the associated storage device 300 is read and placed in the memory 113. Consequently, the OS is activated in the CPU 112, and the CPU 112 executes a facility of, for example, a file server. The file server block 800 includes the nonvolatile RAM 804 in which a network bootstrap loader that conforms to a convention such as the preboot execution environment (PXE) convention is stored, so that the file server block 800 can perform network booting as described later. The bus bridge 805 links the network interface block, the input/output control block, and a group of file servers over a bus.

Figure 8:
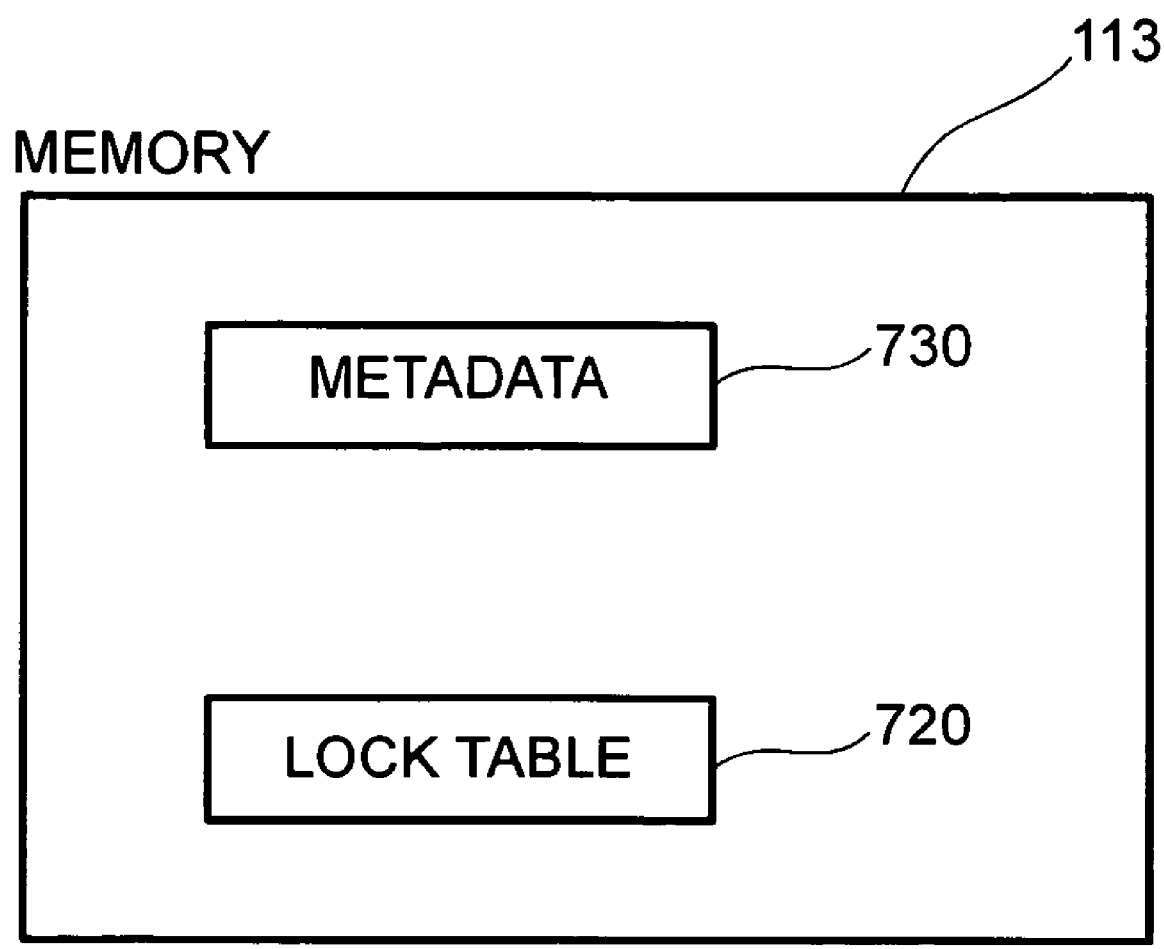
FIG. 8 is an explanatory diagram concerning the breakdown of data stored in a memory employed in the embodiment of the present invention.
Figure 22:
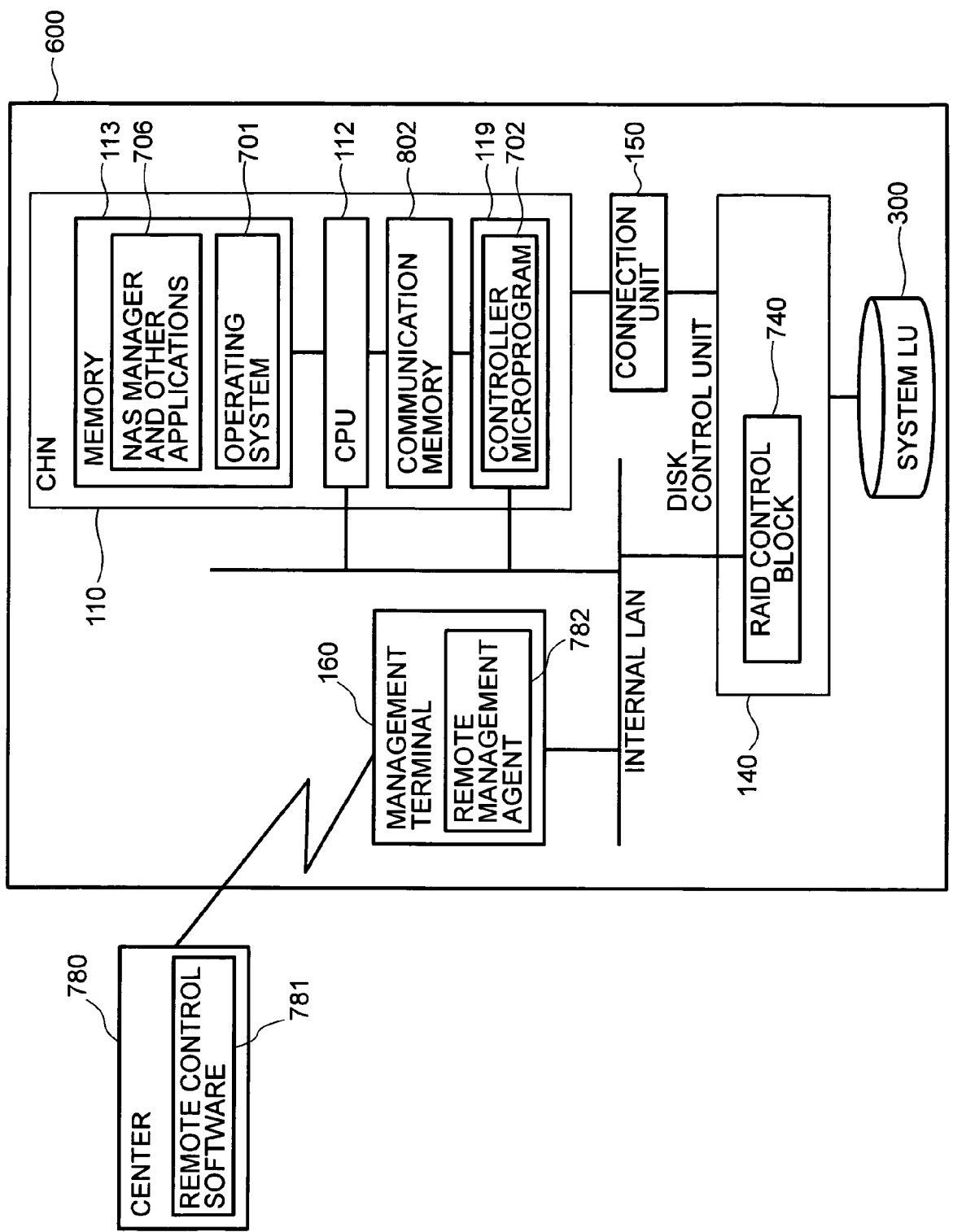
FIG. 22 shows the configuration for collecting an OS log or a CORE dump which is included in the storage device system in accordance with the embodiment of the present invention.

Various programs and data items are stored in the memory 113. For example, metadata 730 and a lock table 720 shown in FIG. 8, or various programs including a NAS manager 706 shown in FIG. 22 are stored in the memory 113. The metadata 730 is information produced in association with each of files managed by a file system. The metadata 730 contains the address of an LU in which a file of data is stored, the size of data, or any other information specifying a place in which a file is preserved. The metadata 730 may contain information such as a storage capacity required by a file, an owner, and a time instant of update. Moreover, the metadata 730 may be produced in association with a directory but not with a file. FIG. 9 shows an example of the metadata 730. The metadata 730 is stored in each of the LUs defined in the storage devices 300.

The lock table 720 is a table used to exclusively control access to a file gained by each of the first to third information processing units 200. The exclusive control permits the first to third information processing units 200 to share the same file. FIG. 10 shows the lock table 720. As shown in FIG. 10, the lock table 720 falls into a file lock table 721 and a LU lock table 722. The file lock table 721 is a table used to indicate whether each file is locked. If any information processing unit 200 opens a certain file, the file is locked. The other information processing units 200 are inhibited from gaining access to the locked file. The LU lock table 722 is a table used to indicate whether each LU is locked. If any information processing unit 200 accesses a certain LU, the LU is locked. The other information processing units 200 are inhibited from gaining access to the locked LU.

The input/output control block 114 transfers data or a command to or from the disk control units 140, cache memory 130, common memory 120, and management terminal 160. The input/output control block 114 includes the I/O processor 119 and nonvolatile RAM 115. The I/O processor 119 is formed with, for example, a one-chip microcomputer. The I/O processor 119 controls transfer of a data writing/reading request, which requests writing or reading of data in or from an associated one of the LUs in the storage devices 300, or data, and repeats the communication between the CPU 112 and any of the disk control units 140. The nonvolatile RAM 115 is a nonvolatile memory in which a program according to which the I/O processor 119 is controlled is stored. The contents of the program stored in the nonvolatile RAM 115 can be overwritten or rewritten in response to a directive given from the management terminal 160 or the NAS manager 706 that will be described later.

Figures 11, 12:
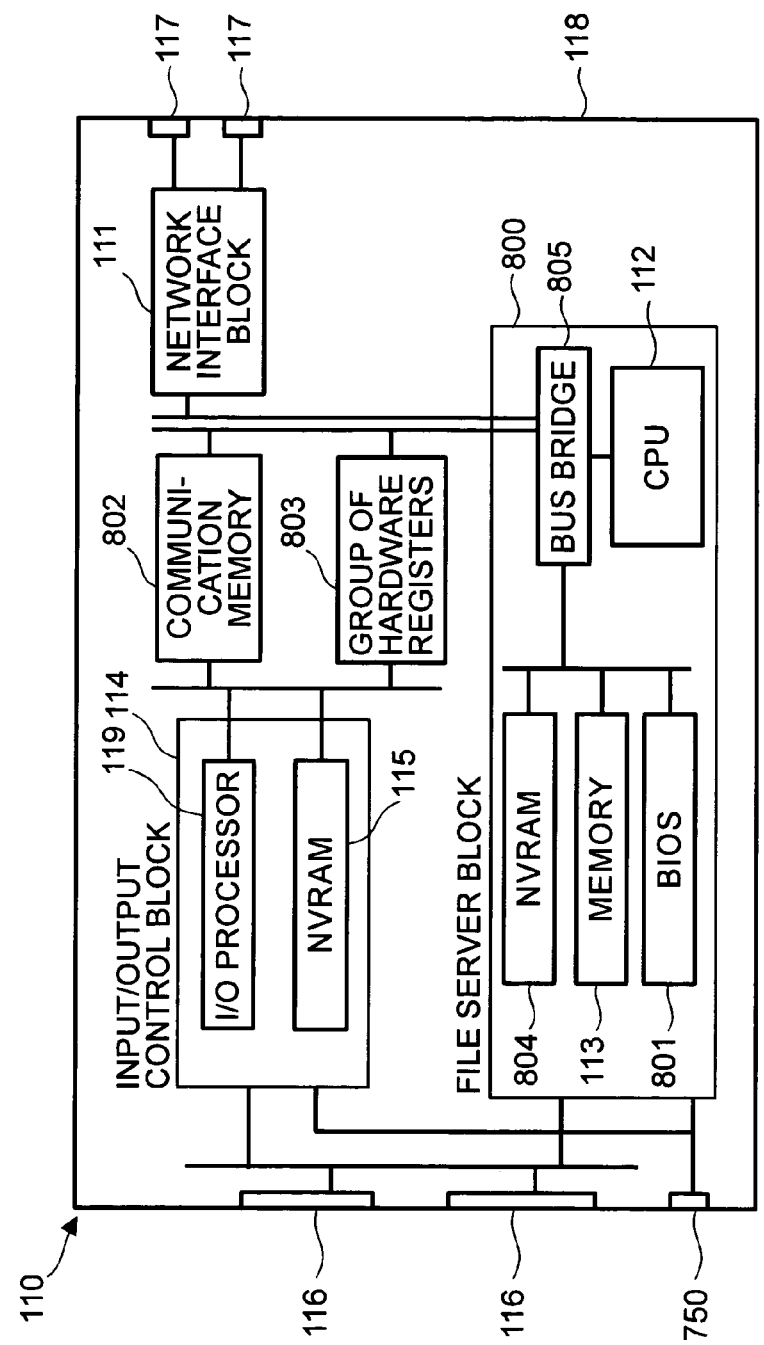
FIG. 11 shows a communication path between a CPU and an I/O processor included in a channel control unit CHN employed in the embodiment of the present invention.
FIG. 12 shows data to be transferred from the I/O processor to the CPU according to the embodiment of the present invention.

FIG. 11 shows a concrete example of a communication path between the CPU 112 and I/O processor included in each channel control unit CHN110. The I/O processor 119 and CPU 112 are physically connected to each other via a communication memory 802 and a group of hardware registers 803 that are mounted on the circuit board of the channel control unit CHN110. Either of the CPU 112 and I/O processor 119 can access the communication memory 802 and group of hardware registers 803. By utilizing the communication memory 802, the I/O processor 119 and CPU 112 can transmit an interrupt signal or data to a destination that is an object of access. The group of hardware registers 803 is connected to a circuit that starts or discontinues power supply to the CPU 112. Consequently, by accessing the group of hardware registers 803, the I/O processor 119 can manipulate power supply to the CPU 112. The group of hardware registers 803 has a plurality of abilities including the ability to produce an interrupt signal so as to notify a destination to be accessed of the fact that the CPU 112 or I/O processor 119 has accessed the group of hardware registers 803. The plurality of abilities is assigned to registers constituting the group of hardware registers 803 on a hardware basis.

Figure 13:
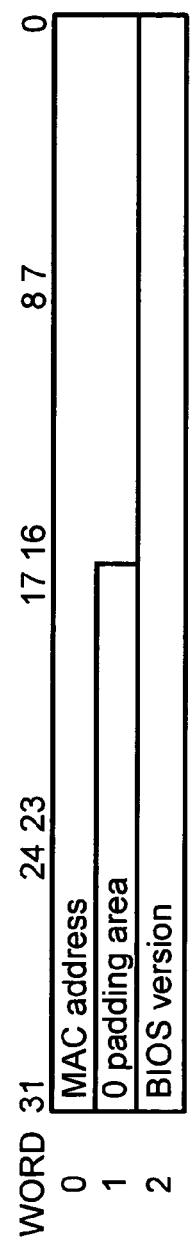
FIG. 13 shows data to be transferred from the CPU to the I/O processor according to the embodiment of the present invention.

FIG. 12 and FIG. 13 show examples of a data structure to be stored in the communication memory 802 included in each channel control unit CHN110. FIG. 12 shows a data structure used to transfer information from the I/O processor 119 to the CPU 112. FIG. 13 shows a data structure used to transfer information from the CPU 112 to the I/O processor 119. The information to be transferred between the CPU 112 and I/O processor 119 is mainly a group of pieces of information to be transferred when the CPU 112 and I/O processor 119 are activated with power supply started.

The information to be transferred from the I/O processor 119 to the CPU 112 includes a type of device to be activated, a diagnosis execution flag, a plurality of drive numbers, time instant information, the number of command retries, a command timeout value, and a plurality of pieces of temperature information. The type of device to be activated is the type of device to be activated under the control of the BIOS 801 when the CPU 112 is started. For example, the type of device to be activated is a network or a disk drive. A drive number is a number with which a disk drive serving as a source from which an OS is loaded when a disk drive is specified as the type of device to be activated. According to the present embodiment, the concept of an LU is adapted to the storage devices 300, and an OS or the like is stored in the LUs. LU numbers assigned to the LUs are regarded as drive numbers. Priorities are assigned to the drive numbers. If drive number 0 has priority over drive number 1, the CPU 112 attempts to first activate the LU associated with the drive number 0. If the activation fails, the CPU 112 attempts to activate the LU associated with the drive number 1. The diagnosis execution flag is used when the I/O processor 119 directs whether hardware peripheral to the file server block 800 should be diagnosed within the BIOS 801 at the time of activation of the CPU 112. For example, when initialization of the file server block 800 is completed, if the CPU 112 alone is reactivated, hardware need not be diagnosed again within the BIOS 801. In this case, the I/O processor 119 properly sets the diagnosis execution flag so as to prevent the CPU 112 from diagnosing hardware peripheral to the file server block 800 again. The time instant information is used when the BIOS 801 and OS are run in the CPU 112. The I/O processor 119 acquires the time instant information from the management terminal 160, and hands it to the CPU 112. Consequently, the management terminal 160, I/O processor 114, and CPU 112 can agree their pieces of time instant information with one another. The number of command retries and command timeout value are the conditions under which if a command issued from the CPU 112 to the I/O processor 119 fails, the BIOS 801 or OS runs in the CPU 112 or performs a timeout. The temperature information indicates a value designated for the CPU 112 so that the CPU 112 can sense an abnormal change in temperature by itself.

As mentioned above, according to the present embodiment, the I/O processor 119 can freely determine such values as the type of device to be activated, drive number, time instant information, number of command retries, command timeout value, and plurality of pieces of temperature information. The present embodiment is not limited to this mode. Alternatively, the values may be stored as initial values in the nonvolatile memory in which the BIOS is stored. Preferably, an operator may enter the values at the management terminal 160, or the values may be registered in advance in the memory included in the management terminal 160 so that the management terminal 160 can hand the values to the I/O processor 119. The diagnosis execution flag is set based on logical judgment to be made during activation of the I/O processor 119 or designated by an operator. If the diagnosis execution flag is set based on logical judgment made during activation of the I/O processor 119, the actions of the CPU 112 or the behavior of the BIOS 801 that is loaded in the CPU 112 can be controlled by the I/O processor 119.

FIG. 13 shows a data structure according to which information is handed from the CPU 112 to the I/O processor 119. A BIOS version specifies a version of an object code contained in the BIOS 801. The BIOS version is handed from the CPU 112 to the I/O processor 119 and from the I/O processor 119 to the management terminal 160. An MAC address specifies a media access control (MAC) address assigned to the CPU 112. The MAC address is a unique identifier in the world allocated to hardware, and information needed in order to assign IP address to a DHCP server, which adopts the dynamic host configuration protocol (DHCP), on a LAN that adopts the IP. 0-padding information is used to pad a border between words with 0s and has nothing to do with information.

Figure 14:
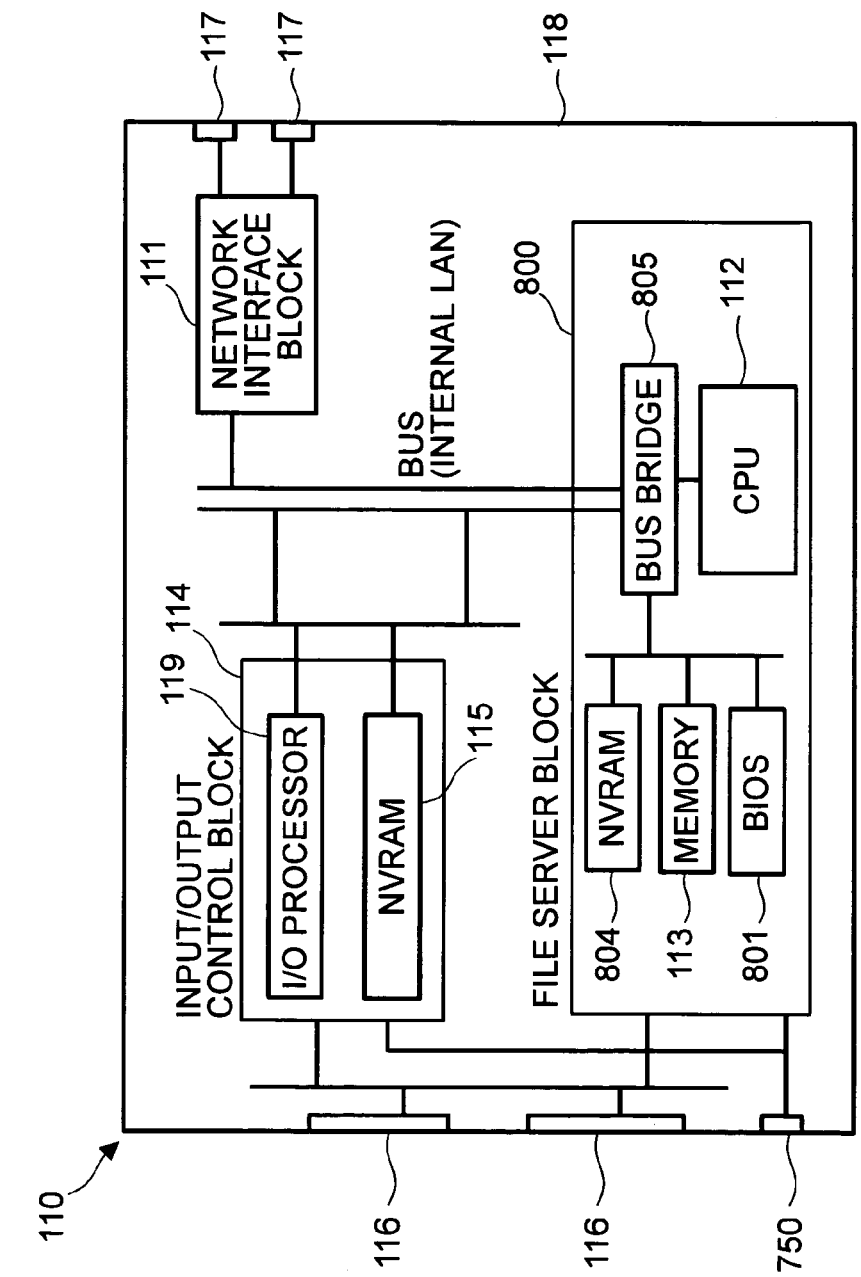
FIG. 14 shows the hardware configuration of a channel control unit CHN that has an internal LAN and is employed in the embodiment of the present invention.

FIG. 14 shows the hardware configuration showing the connection over the internal LAN 151 between the CPU 112 and I/O processor 119. As illustrated, the CPU 112 and I/O processor 119 are connected to each other over the internal LAN 151, and can therefore communicate with the management terminal 160 over the internal LAN 151. Consequently, for example, the CPU 112 runs a network loader that is stored in the nonvolatile RAM 804 in advance so as to download activation software from the management terminal 160 to the memory 113. The activation software is then run. Consequently, a network booting process is executed with the management terminal 160 and CPU 112 regarded as a server and a client respectively. Incidentally, the network booting is a process of executing or activating the core image data of an OS resident in the management terminal 160 on the LAN. The process is performed by a network bootstrap loader installed in the client and the server software running in the management terminal 160 according to a combination of the IP, DHCP, trivial file transfer protocol (TFTP), and file transfer protocol (FTP). The management terminal 160 runs a dumping program, whereby a dumping instruction is transmitted to the I/O processor 119 via the board connection connector 116 over the internal LAN 151. In response to the dumping instruction, the I/O processor 119 directs the CPU 112 to collect a dump. It is not preferred in terms of security that the management terminal 160 issues a dumping instruction directly to the CPU 112. The dumping instruction is therefore transmitted via the I/O processor all the time. This will be detailed in relation to three dumping methods.

Figure 15:
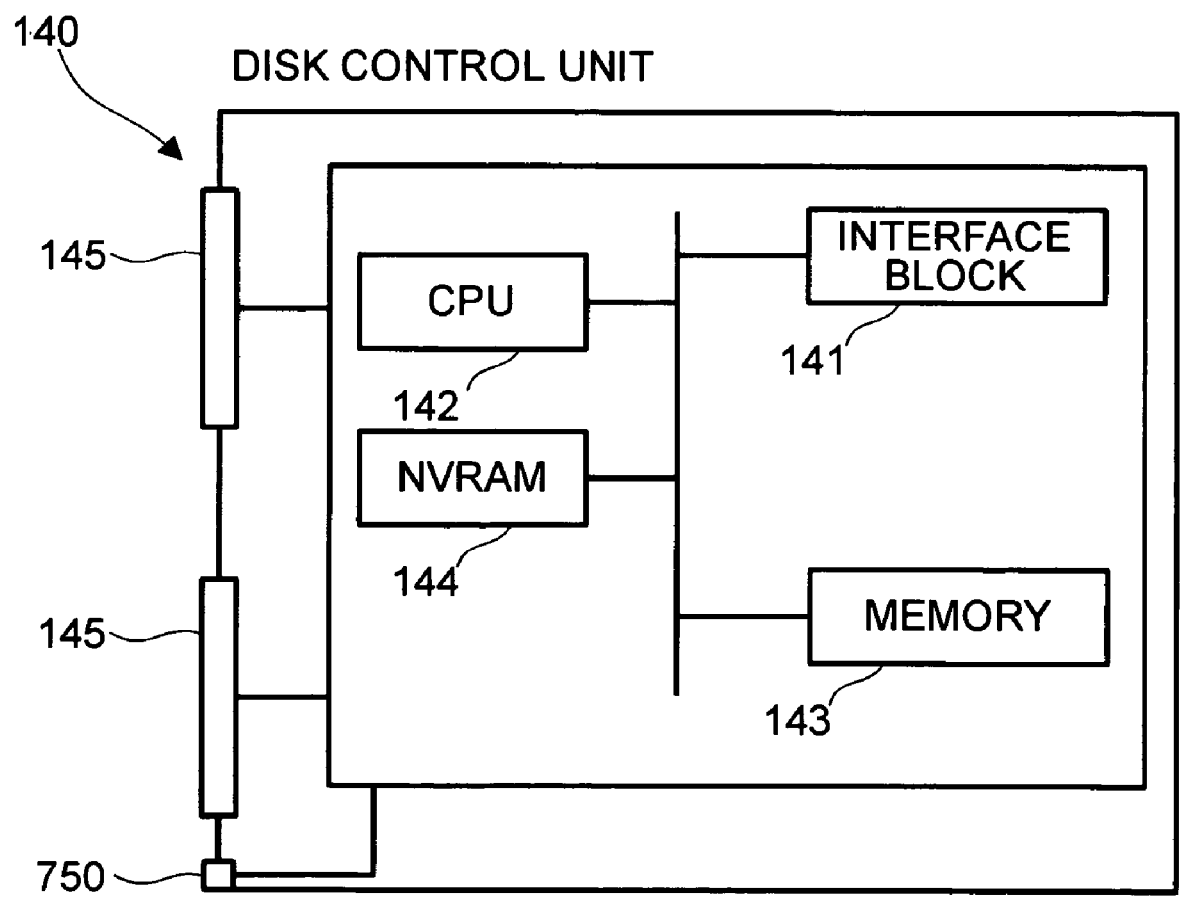
FIG. 15 shows a disk control unit employed in the embodiment of the present invention.

FIG. 15 is a block diagram showing the hardware configuration of each disk control unit 140. As already described, the disk control units are connected to the storage devices 300 and also connected to the channel control units CHN110 via the connection unit 150. The disk control units 140 write or read data in or from the storage devices 300 by themselves or under the control of the channel control units CHN110.

Each disk control unit 140 comprises an interface block 141, a memory 143, a CPU 142, a nonvolatile RAM 144, and a board connection connector 145 that are integrated into one unit.

The interface block 141 includes: a communication interface via which the disk control unit communicates with an associated channel control unit 110 via the connection unit 150; a communication interface via which the disk control unit communicates with an associated storage device 300; and a communication interface via which the disk control unit communicates with the management terminal 160 over the internal LAN 151.

The CPU 142 is responsible for control of the entire disk control unit 140, and communicates with the associated channel control unit 110, associated storage device 300, and management terminal 160. Various programs stored in the memory 143 and nonvolatile RAM 144 are executed in order to realize the capabilities of the disk control unit 140 employed in the present embodiment. The capabilities of the disk control unit 140 are the capabilities to control the associated storage device 300, to control the RAID levels, to manage a copy of data stored in the storage device 300, to control a backup thereof, and to control remote copy.

The nonvolatile RAM 144 is a nonvolatile memory in which a program responsible for control of the CPU 142 is stored. The contents of the program stored in the nonvolatile RAM 144 are overwritten or rewritten in response to a directive given from the management terminal 160 or NAS manager 706.

Moreover, each disk control unit 140 includes a board connection connector 145. The board connection connector 145 is joined to a connector formed in the storage device controller 100, whereby the disk control unit 140 is electrically connected to the storage device controller 100.

(Installation)

Next, a description will be made of installation of software that is necessary to allow the storage device system 600' in accordance with the present embodiment to act as a NAS system.

For allowing the storage device system 600 as a NAS system, it is necessary to install an OS 701 to be run in the channel control units CHN110. Moreover, a microprogram (firmware) to be run in the channel control units CHN110 and disk control units 140 must be installed. Moreover, a volume manager 707, a file system program 703, a NAS manager 706, and other application programs are installed in the channel control units CHN110, if necessary. Moreover, a remote copy control program 750, a copy management program 760, and others are installed in the disk control units 140, if necessary.

The OS 701 and application programs are stored in the system LUs defined in the storage devices 300. The system LUs may be assigned to an OS installation area, a fault detection storage area, and a cluster information storage area. Information on fault management such as a dump list produced by the OS 701 or application program (a list of core dumps, memory dumps, and disk dumps produced with occurrence of abnormal termination of a kernel in the OS 701, abnormal terminal of a demon, or detection of an abnormality deriving from looping of a plurality of processes) is stored in the fault detection storage area. Information needed to determine a cluster by gathering the channel control units CHN110 is stored in the cluster information storage area. Since the storage areas in which the OS 701 and application programs are stored are defined in the storage devices 300, such storage areas need not be defined in the channel control units CHN110.

Moreover, the fault detection storage area and cluster information storage area may be defined as a fault management LU and a cluster LU respectively independently of the systems LU. If the storage devices 300 are used at RAID level 5, the systems LU, fault management LU, and cluster LU are not grouped together in terms of one parity technique of testing transmitted data, but are preferably distributed into groups for which a plurality of parity techniques is adopted. This is because data important for operation of the storage device controller 100 is stored in the LUs.

Next, a description will be made of a procedure for installing the OS 701 and a microprogram that are required for allowing the storage device system 600 to act as a NAS system. These programs are installed using the management terminal (computer) 160.

Figure 16:
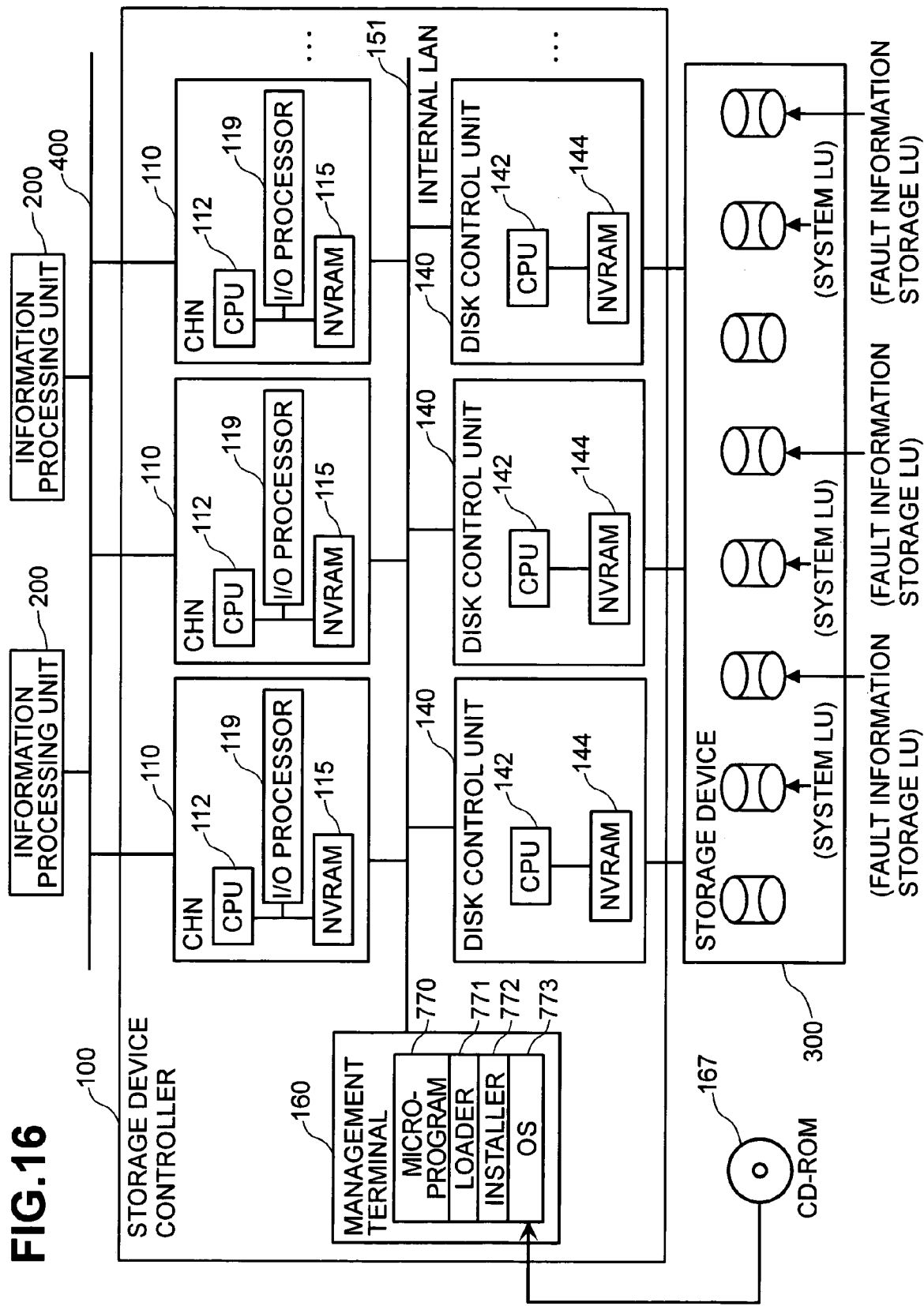
FIG. 16 is a block diagram for explaining an installation procedure employed in the embodiment of the present invention.

FIG. 16 is a block diagram for explaining the installation procedure. FIG. 17 shows an example of a screen image that is displayed on the output device 166 included in the management terminal 160 and used for the installation.

Referring to the block diagram of FIG. 16, the storage device controller 100 is connected to the information processing units 200 over the LAN (first network) 400 and receives a file access request from the information processing units 200. Moreover, the storage device controller 100 includes the management terminal 160. The management terminal 160 is connected to the channel control units CHN110 and disk control units 140 over the internal LAN (second network) 151. A microprogram 770, a loader 771, an installer 772, and an OS 773 are stored in the management terminal 160. More particularly, these programs are stored in the memory 162 and storage device 168 included in the management terminal 160. The microprogram 770 falls into a type being written in the nonvolatile RAMs 115 in the channel control units CHN110 and a type being written in the nonvolatile RAMs 144 in the disk control units 140. The former is a program responsible for control of the I/O processor 119 included in each channel control unit CHN110, while the latter is a program responsible for control of the CPU 142 included in each disk control unit 140. The loader 771 and installer 772 are programs used to read the OS 773 from the management terminal 160 and to write it in the channel control units CHN110. The OS 773 is installed in the system LUs that are defined in the storage devices 300 in association with the channel control units CHN110. These programs may be read from the recording medium 167, which is formed with a CD-ROM or the like, using the recording medium reader 164 included in the management terminal 160, or may be downloaded from, for example, the Internet via the port 163.

Moreover, one or more fault information storage LUs may be defined in the storage devices 300 so that fault detection information or fault information can be stored in the fault information storage LUs. The fault information storage LUs may be prepared in advance. Otherwise, when the OS 773 is installed in the system LUs, the fault information storage LUs may be prepared. Preparing the fault information storage LUs includes formatting and creation of a file in which fault information is recorded.

FIG. 17 shows an example of a screen image displayed on the output device 166 included in the management terminal 160. Herein, assume that the settings of the channel control units CHN110 newly loaded in the slots of slot Nos. 1 to 4 are determined through the screen image. Referring to FIG. 17, the settings of the channel control units loaded in the slots of slot Nos. 5 to 8 are listed. The already determined settings of the channel control units loaded in the slots may not be displayed, or an operator's entry may be unaccepted.

The installation screen image shown in FIG. 17 has a slot number column, a channel adapter column, a system LU number column, and a fault information storage LU number column. An operator can enter information in the channel adapter column, system LU number column, and fault information storage LU number column.

In the channel adapter column, the types of channel control units 110 to be loaded in any slots formed in the storage device controller 100 are entered. The types of channel control units 110 include CHA, CHF, and CHN. Any of CHA, CHF, and CHN can be selected by clicking the mouse within a triangular mark that tapers downward as shown in FIG. 17.

In the system LU number column, system LU numbers are entered. Any of the LUs defined in the storage devices 30 can be selected as the system LUs. The system LUs are designated in association with the respective channel control units CHN110. If the storage capacity of an LU designated as the system LU is smaller than a predetermined storage capacity, the OS 773 cannot be installed in the LU. Therefore, the management terminal 160 has the ability to check the storage capacity of an LU whose number is entered in the system LU number column. Incidentally, a plurality of channel control units CHN110 can share the same system LU.

In the fault information storage LU number column, LU numbers of LUs in which fault information sensed or reported by the channel control units 110 is stored are entered. The LU number can be designated by clicking the mouse within the triangle mark that tapers downward as shown in FIG. 17. Incidentally, the fault information storage LU may be determined in association with each channel control unit or in association with a plurality of or all channel control units. Moreover, the fault information storage LUs may be determined arbitrarily irrespective of a channel control unit.

When an operator completes entering information relative to the slot Nos. 1 to 4 as shown in FIG. 17, the operator clicks the mouse within an OK button. Consequently, the management terminal 160 starts installing software onto the channel control units CHN110 loaded in the slots of slot Nos. 1 to 4.

Figure 19:
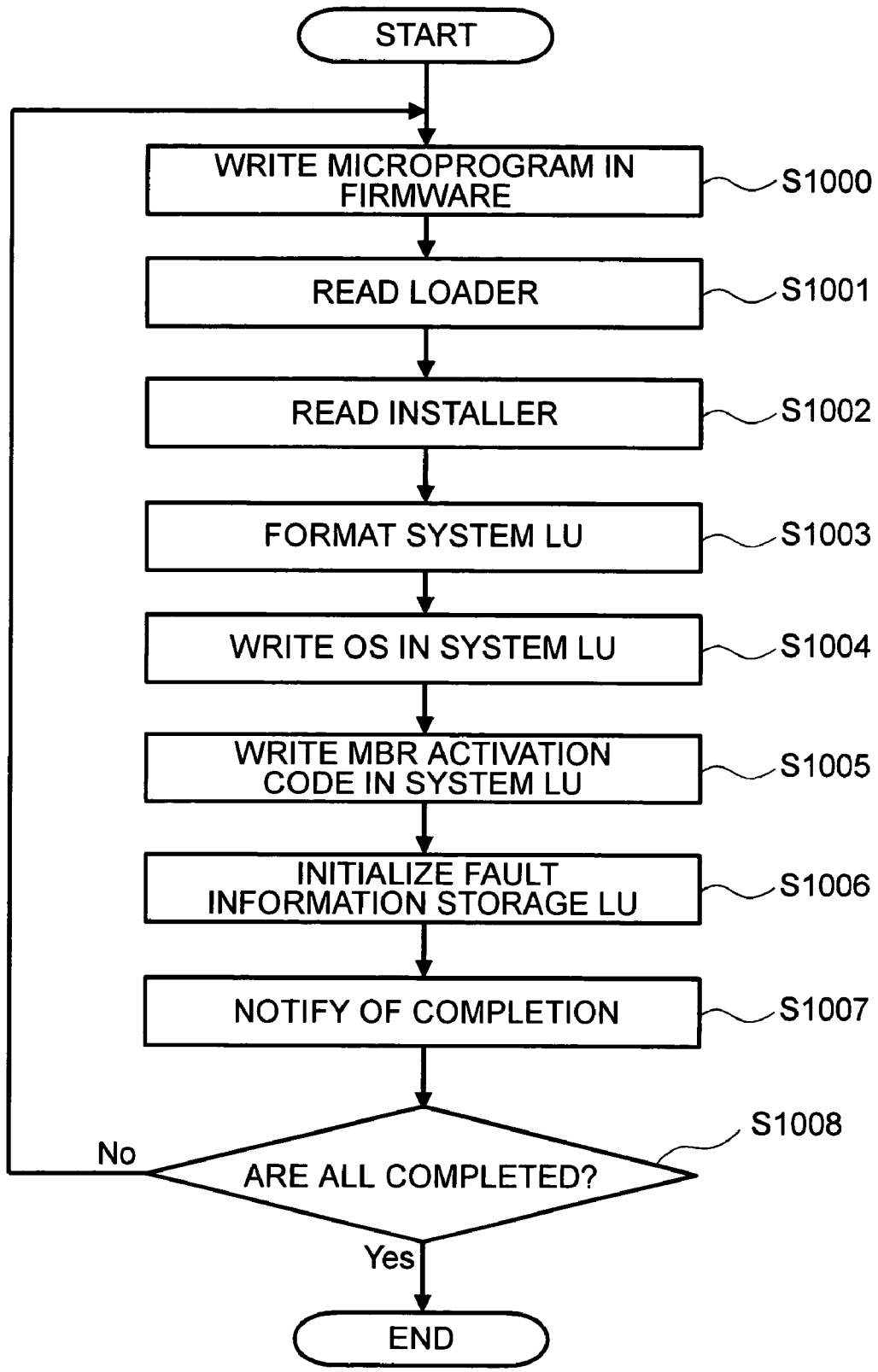
FIG. 19 is a flowchart describing an installation procedure employed in the embodiment of the present invention.

FIG. 19 is a flowchart describing the installation procedure. With a directive given by an operator who handles the management terminal 160, a microprogram rewriting program is run in the management terminal 160. Consequently, a media access control (MAC) address assigned to any of the channel control units CHN110 or any of the disk control units 140 in which the microprogram 770 is written (information with which the channel control unit CHN110 or disk control unit 140 is discriminated from the others) is stored in, for example, the memory 162 in the management terminal 160. The microprogram 770 is then written in the nonvolatile RAM 115 in the specific channel control unit CHN110 whose MAC address is stored in the management terminal 160 or in the nonvolatile RAM 144 in the specific disk control unit 140 whose MAC address is stored in the management terminal 160 (S1000). The management terminal 160 performs the writing over the internal LAN 151. A destination in which the microprogram 770 is written can be determined based on input information entered through the installation screen image. Moreover, the MAC address of the destination in which the microprogram 770 is written is acquired by transmitting a MAC address query command to the channel control units CHN110 or disk control units 140 which are interconnected over the internal LAN 151. Information with which each of the channel control units CHN110 or each of the disk control units 140 is identified and which is stored in the management terminal 160 is not limited to the MAC address. Alternatively, for example, an IP address will do. Otherwise, a serial number assigned to each of the channel control units CHN110 or each of the disk control units 140 will do. Moreover, the microprogram 770 to be written may be provided as a software package in the form of the recording medium 167 such as a CD-ROM or may be downloaded via the Internet.

As mentioned above, the microprogram 770 is written in any of the channel control units CHN110 or any of the disk control units 140 whose MAC address is stored in the management terminal 160. Consequently, the microprogram 770 is written in a specific channel control unit CHN110 or a specific disk control unit 140. Consequently, the microprogram 770 can be written in any of the channel control units CHN110 or any of the disk control units 140 in which the stored microprogram 770 must be rewritten. Moreover, the microprogram 770 that should be written in the channel control units CHN110 can be prevented from being incorrectly written in the channel control units CHA110 or CHF110.

Thereafter, the channel control unit CHN110 and disk control unit 140 are reset. Consequently, the installed microprogram 770 starts running. Herein, for example, the management terminal 160 initiates the reset. After the reset is completed, when the disk control unit 140 starts operating, the management terminal 160 identifies an associated one of the LUs in the storage devices 300.

Thereafter, the management terminal 160 transmits a directive, which directs reading of the loader 771, to the channel control unit CHN110 whose MAS address is stored in the management terminal 160. The loader 771 is a program to be run in order to read the installer 772 from the management terminal 160 into the channel control unit CHN110. The directive that directs reading of the loader 771 and that is sent from the management terminal 160 is contained in the basic input/output system (BIOS) in the CPU 112 included in the channel control unit CHN110. Consequently, the loader 771 is read from the management terminal 160 into the channel control unit CHN110 (S1001).

Thereafter, the loader 771 reads the installer 772 from the management terminal 160 (S1002). The installer 772 provides the capability relevant to communication over the internal LAN 151 as well as the capability to format an LU on the basis of a file system and the capability to write a file in the LU.

Thereafter, the installer 772 partitions the system LU, which is associated with the channel control unit CHN110, for the purpose of preserving an area in which the OS 773 is installed, and formats the system LU while acting as a file system (S1003). The installer 772 then reads the OS 773 from the management terminal 160, and writes it in the formatted installation area in units of a file (S1004). Moreover, the installer 772 reflects the settings of the internal LAN 151 on a setting file contained in the written OS 773.

Furthermore, the installer 772 writes a master boot record (MBR) activation code in the system LU in which the OS 773 is written so as to validate the MBR (S1005). Consequently, when the channel control unit CHN110 is reset, the OS 773 is automatically activated.

Thereafter, the installer 772 initializes the fault information storage LU in which fault information reported from the OS 773 or the channel control unit 110 associated with the fault information storage LU is stored (S1006). Consequently, the area in which fault information is stored is preserved.

When the foregoing processing is completed, the I/O processor 119 included in the channel control unit CHN110 notifies the management terminal 160 over the internal LAN 151 that installation has been completed (S1007).

The management terminal 160 repeatedly performs the foregoing installation on the channel control units CHN110 loaded in the respective slots of slot Nos. 1 to 4 (S1008). If the processing is completed for all the channel control units CHN110 in the slots of slot Nos. 1 to 4, installation is completed.

The foregoing installation procedure makes it possible to handle the firmware and OS 773 smoothly according to a procedure.

Thereafter, the settings of each channel control unit CHN110 are determined so that the channel control unit CHN110 will act as an NAS device. The settings include an IP address to be assigned, a user area to be defined, an OS to be determined, and a cluster to be determined. The NAS manager 706 determines the settings. An IP address is assigned to each of two communication ports of each channel control unit CHN110. A user area is defined by storing a file system in a user LU. An OS is determined by determining a mount point within the file system stored in the user LU or defining a user or a group.

(Clustering)

Clustering is to classify the plurality of channel control units 110 mounted in the storage device controller 100 into groups of same types of channel control units 110. Consequently, even if a fault occurs in any of channel control units 110 belonging to the same cluster (group), any other channel control unit 110 belonging to the same cluster can take over the processing in which the faulty channel control unit 110 has been engaged so far.

The storage device system 600 in accordance with the present embodiment includes two groups of power supplies for the purpose of improving reliability. Each of the slots included in the storage device controller 100 is connected to the power supply belonging to either of the groups. Clustering is performed so that each cluster will include channel control units 110 connected to the respective groups of power supplies. In other words, the channel control units 110 constituting a cluster should not be connected to the same group of power supplies. Consequently, even if power supply is suspended because of a fault occurring in either of the groups of power supplies, power supply to other channel control unit 110 that belongs to the same cluster and is connected to the other group of power supplies is continued. Failover that is the transition to the backup channel control unit 110 is achieved.

Figure 20:
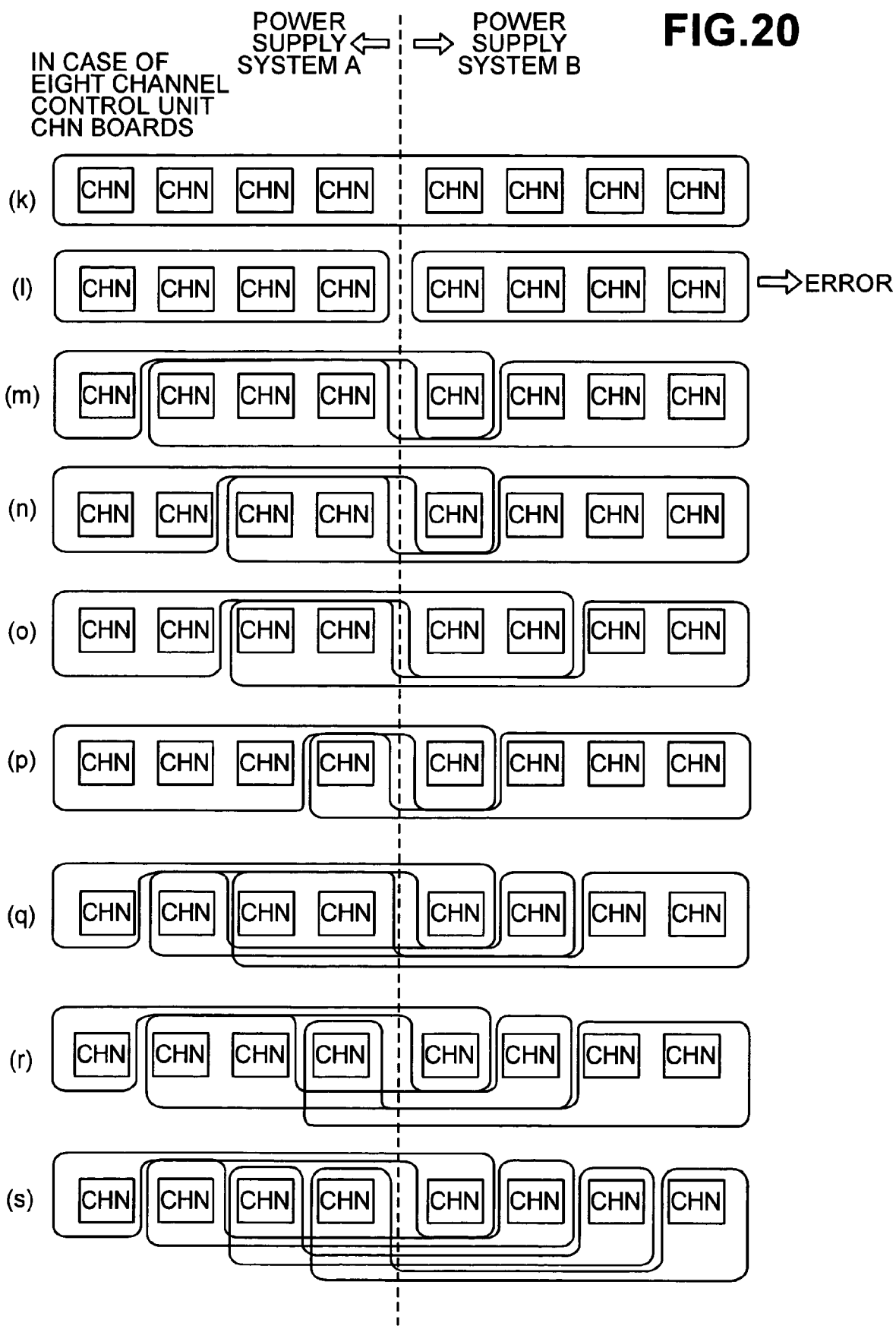
FIG. 20 shows a way of determining clusters according to the embodiment of the present invention so that each cluster will include channel control units connected to a plurality of power supplies.
Figure 21:
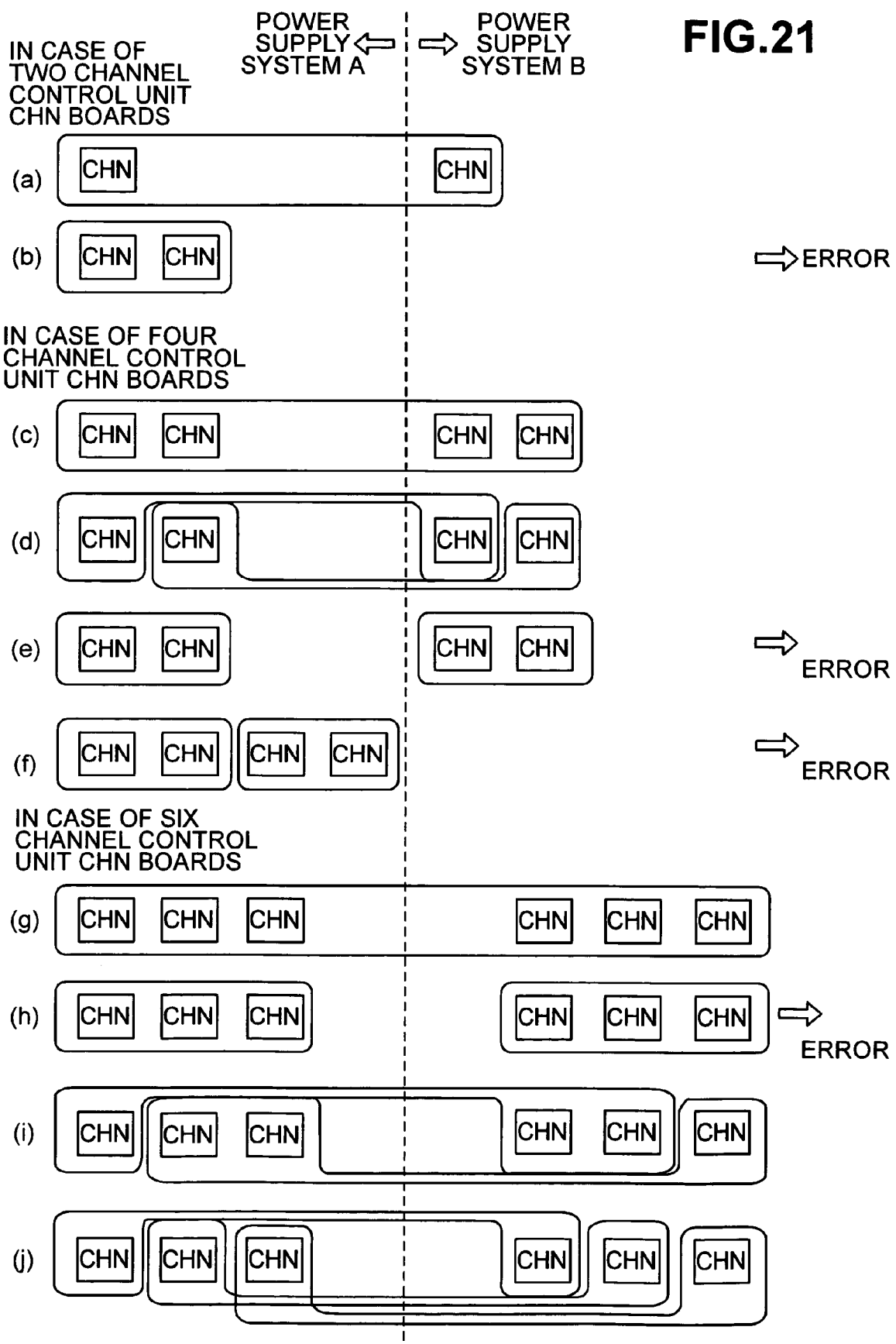
FIG. 21 shows a way of determining clusters according to the embodiment of the present invention so that each cluster will include channel control units connected to a plurality of power supplies.

FIG. 18 shows an example of a screen image to be displayed on the information processing units 200 and used for clustering. FIG. 20 and FIG. 21 show the ways of clustering channel control units so that each cluster will include the channel control units 110 connected to both the groups of power supplies.

A clustering screen image shown in FIG. 18 contains a group-of-power supplies column, a slot number column, a board ID column, a type-of-board column, a first failover destination column, a second failover destination column, and a common LU column.

In the group-of-power supplies column, the group of power supplies to which each slot is connected is specified. As seen from the example of the screen image shown in FIG. 18, the slots bearing odd numbers are connected to the group of power supplies A, while the slots bearing even numbers are connected to the group of power supplies B.

In the board ID column, the identifiers assigned to the circuit boards realizing the channel control units 110 and being loaded in the respective slots are specified. As the board ID, for example, a serial number or an IP address is specified.

The type-of-board column specifies the types of channel control units 110 loaded in the respective slots. The types of boards realizing the channel control units 110 include CHN, CHA, and CHF.

The first failover destination column is an entry column in which circuit boards into which a transition is made from circuit boards for failover in case of occurrence of a fault in the circuit boards are entered. This entry is achieved by clicking the mouse within a triangular mark that tapers downward as shown in FIG. 18.

The second failover destination column is an entry column in which circuit boards, into which a transition is made from circuit boards for failover if a transition cannot be made to the circuit boards specified in the first failover destination column, are entered. This entry is achieved by clicking the mouse within the triangular mark that tapers downward.

The common LU column is an entry column in which LUs accessible in common by the channel control units 110 belonging to the same cluster is specified. Takeover information or the like needed to perform failover is stored in the common LU.

After an operator enters information in all the columns, the operator clicks the mouse within an Enter button. Consequently, the setting information is transmitted to the storage device controller 100. It is then inspected whether the channel control units 110 belonging to the same cluster are connected only to the group of power supplies A or the group of power supplies B. If the channel control units 110 are connected only to the group of power supplies A or B, a warning is presented through a user interface provided by each of the information processing units 200. For example, if the information processing units 200 include a buzzer, the buzzer is sounded. Otherwise, an error message is displayed on a display device included in each of the information processing units 200. If the power supplies of the channel control units 110 belonging to the same cluster are connected to both the groups of power supplies, the setting information is stored in the memories 113 included in the respective channel control units 110 or the common LU. Thus, clustering is completed. The settings may also be stored in the cluster information storage areas of the associated system LUs and in the cluster LU. Incidentally, clustering may be executed at the management terminal 160.

FIG. 20 and FIG. 21 show the ways of clustering channel control units so that each cluster will include the channel control units 110 connected to two groups of power supplies.

As described previously, the storage device controller 100 has eight slots. It is free to what channel control units 110 are loaded in what slots. The channel control units CHF110, CHA110, and CHN110 may be mixed and loaded. FIG. 20 and FIG. 21 show examples of clustering the channel control units CHN110.

FIG. 21 shows examples in which two channel control units CHN110, four channel control units CHN110, and six channel control units CHN110 are loaded. As shown in FIG. 21, the combinations (b), (e), (f), and (h) are judged to be in error because the channel control units CHN110 belonging to the same cluster are connected only to only one group of power supplies.

FIG. 20 shows examples in which eight channel control units CHN110 are loaded. The combination (l) is judged to be in error because the channel control units CHN110 belonging to the same cluster are connected to only one group of power supplies.

As mentioned above, in the storage device system 600 in accordance with the present embodiment, the channel control units CHN110 are clustered so that they will not be connected to only one group of power supplies. Consequently, even if one group of power supplies suspends power supply because of a fault, failover can be achieved so that a transition will be made to a channel control unit 110 that belongs to the same cluster but is connected to the other group of power supplies. Thus, the useful storage device system 600 can be provided.

(Kinds of Dumps)

Dumps to be collected are broadly classified into three kinds.

The first kind of dumps includes a core dump and an OS log. The core dump is data read as a file from a memory or a register when, as mentioned previously, the kernel in the OS 701 terminates abnormally or a demon terminates abnormally. The OS log is a log collected by the OS 701 or NAS manager 706 or a log collected by an application that runs on the OS. The core dump or OS log is stored in the system LUs.

The second kind of dump is a register dump. What is referred to as a register dump is information in a memory or the register in the CPU 112 which the I/O processor 119 collects when sensing that the temperature of the CPU 112 is abnormal or the OS 701 gets into a panic.

The third kind of dump is a full dump. The full dump is a crash dump collected when the OS 701 gets into a panic. At this time, the OS 701 transmits a dump concerning the kernel to the fault information storage LU. When the full dump is collected, the second kind of dump, that is, the register dump is also collected.

The three kinds of dumps are collected according to different methods. The dumping methods will be described below.

(Dumping-related Diagrams)

Figure 26:
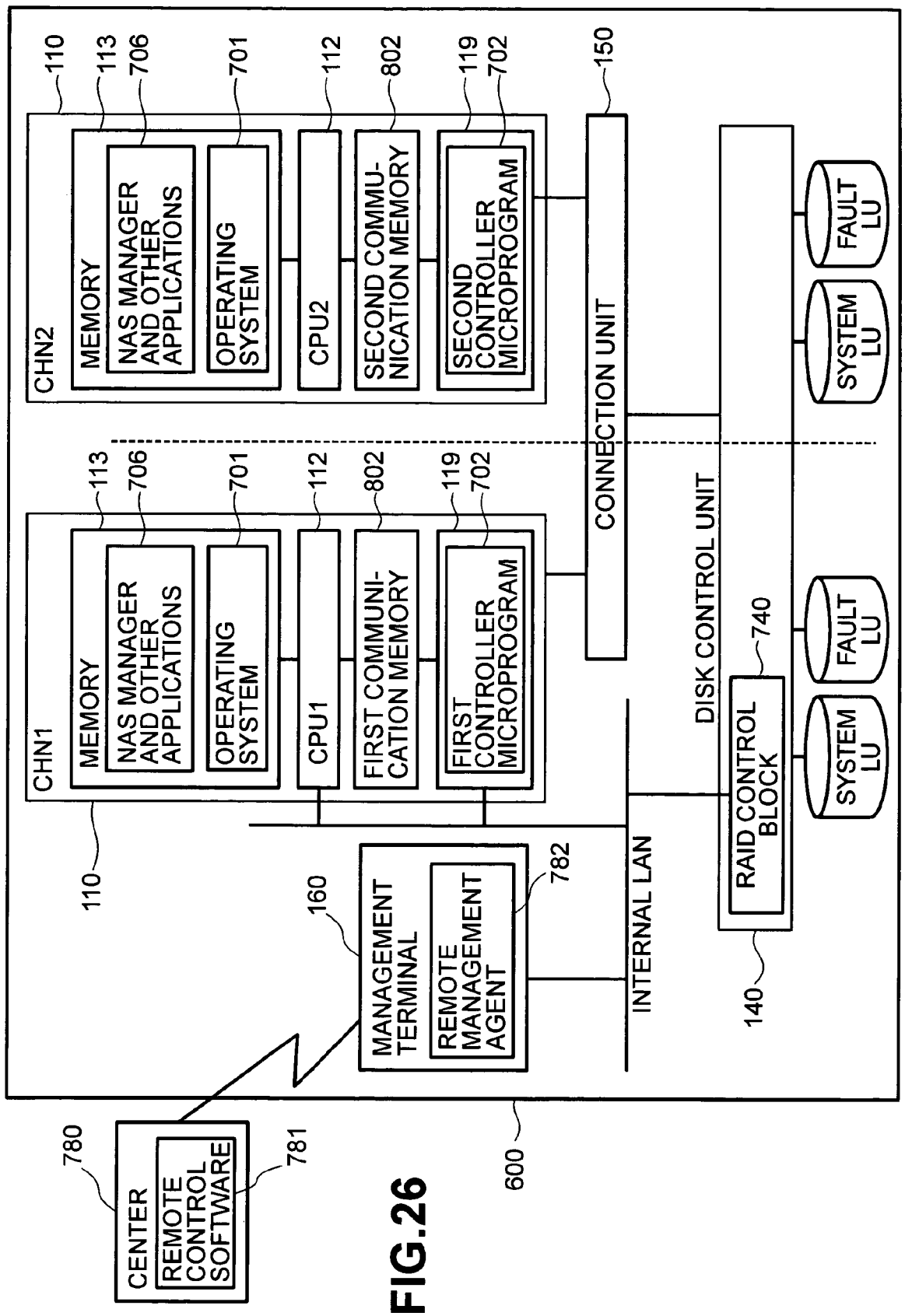
FIG. 26 shows the configuration for collecting a full dump concerning the storage device system in accordance with the embodiment of the present invention.

FIG. 22, FIG. 24, and FIG. 26 show the configuration of the storage device system 600 in accordance with the present embodiment. As already described, each of the channel control units CHN110 includes the CPU 112 and I/O processor 119. The numbers of CPUs 112 and I/O processors 119 may be one, or pluralities of CPUs 112 and I/O processors 119 may be included. The OS 701 and diverse applications including the NAS manager 706 are run in the CPU 112, whereby the CPU 112 operates as a NAS server. The microprogram 702 serving as a controller program runs in the I/O processor 119. A RAID control block 740 operates in the CPU 142 included in each of the disk control units 140. A remote management agent 782 enabling remote control runs in the management terminal 160. The remote management agent 782 uses remote control software 781 residing in a center 780 to transfer a dump that has been transferred to the management terminal 160, or to notify the I/O processor 119 that dumps have been collected. Moreover, after dump data is collected and transferred to the management terminal, when a transfer termination notification is received, the center is notified of the fact. The remote management agent may be one software program or may be realized by combining a plurality of software programs.

(OS Log or Core Dump Collection-related Diagrams)

FIG. 22 shows the configuration of the storage device system 600 attained when the OS log or core dump is collected.

FIG. 23 describes a flow starting with issuance of a dumping request to the management terminal 160 and ending with transfer of the OS log or core dump to the center 780. The flow is described with the CPU 112, I/O processor 119, management terminal 160, and associated storage device 300 (system LU) associated with one another. In FIG. 23, FIG. 25, and FIG. 27, a one-line arrow indicates a control flow and a two-line arrow indicates a data flow.

When the center 780 collects the OS log or core dump, the center 780 uses the remote control software 781 to handle the management terminal 160. The center 780 is connected to the management terminal 160 included in the storage device system 600 over a leased line or a network such as a LAN, WAN, or Internet. The management terminal 160 can be remotely controlled because the remote management agent runs therein. The management terminal 160 instructs the I/O processor 119 included in any of the channel control units to collect the OS log or core dump over the internal LAN (shown) or a bus (not shown) (step 1 of the management terminal 160). As illustrated, the management terminal 160 is connected to the CPU 112 and I/O processor 119 included in each of the channel control units CHN110 and to the RAID control block 740 included in each of the disk control units 140 over the internal LAN or bus. The management terminal 160 communicates various pieces of information including the information of the components of the storage device system. Using the facility of the remote management agent 782, the instruction may be issued by pressing a button. In this case, the management terminal 160 does not directly instruct the CPU 112 but instructs the I/O processor 119. This makes it possible to prevent a maintenance engineer from accessing user data stored in the associated storage device 300 via the CPU 112. The I/O processor 119 sets an OS log collection bit or a core dump collection bit in the communication memory 802 or hardware register in response to the directive given from the management terminal 160 (step 2 of the I/O processor 119). Thereafter, the I/O processor 119 sets a dumping notification bit in the communication memory 802 or hardware register, whereby an OS log and core dump collection instruction is issued to the CPU 112 (step 3 of the I/O processor 119). If the CPU 112 receives the dumping instruction (step 4 of the CPU 112), the CPU 112 requests the I/O processor 119 via the communication memory 802 or hardware register to read the information of the OS log or core dump. The I/O processor 119 requests the RAID control block 740 included in an associated one of the disk control units 140 via the connection unit 150 or common memory 120 to read the information of the OS log or core dump. The disk control unit 140 reads the information of the OS log or core dump from the associated system LU 300. The disk control unit 140 transfers the information of the OS log or core dump to the I/O processor 119 via the connection unit 150 or common memory 120. The I/O processor 119 transfers the information of the OS log or core dump to the CPU 112 via the communication memory 802 or hardware register. The CPU 112 writes the information of the OS log or core dump in the memory 113 (step 5 of the CPU 112). The information written in the memory 113 is edited, compressed, and encrypted in the memory (step 6 of the CPU 112). According to the present embodiment, since editing and compression is performed, a transfer time can be reduced or a line whose line speed is low can be utilized. This leads to a reduction in cost. Moreover, since the transfer time is short, a risk that data may be stolen is limited. When the editing and compression are combined with encryption, it is quite effective in terms of security. The I/O processor 119 collects information concerning dumping, and transmits it as an I/O processor dump to the management terminal (step 7 of the I/O processor). The CPU 112 transfers the compressed and encrypted OS log or core dump to the management terminal 160 over the internal LAN or bus (step 8 of the CPU 112). At this time, one or a plurality of OS logs or core dumps is transmitted to the management terminal 160. After the CPU 112 completes transferring the OS log or core dump to the management terminal 160, the CPU 112 issues a transfer completion notification to the I/O processor 119 (step 9 of the CPU 112). When the I/O processor 119 completes transmitting the I/O processor dump and receives the transfer completion notification from the CPU 112, the I/O processor 119 issues a transfer termination notification to the management terminal 170 over the internal LAN or bus (steps 10 and 11 of the I/O processor). In response to the transfer termination notification sent from the I/O processor, the management terminal 160 transfers the collected OS log or core dump to the center (step 12 of the management terminal 160). However, the present embodiment is not limited to this mode. It is also preferable that the management terminal 160 holds the OS log or core dump in the memory 162 or storage device 168. In this case, if the remote management agent 782 in the management terminal 160 is accessed using the remote control software 781 in the center 780, the management terminal 160 transfers the OS log or core dump to the center 780.

According to the present embodiment, the CPU 112 analyzes the contents of a dumping instruction for the OS log or core dump sent from the management terminal 160. The I/O processor 119 transfers the dumping instruction for the OS log or core dump received from the management terminal 160 to the CPU 112. Owing to this method, the I/O processor 119 can exert the performance thereof for accessing data in the storage device 300 via the connection unit 150 and disk control unit 140.

According to the present embodiment, the CPU 112 makes a request to the disk control unit 140 via the I/O processor 119 for the information of the OS log or core dump. The present embodiment is not limited to this mode. Alternatively, the CPU 112 may make a request directly to the disk control unit 140 for the information of the OS log or core dump. Owing to this method, the I/O processor 119 can exert the performance thereof in accessing data in the storage device 300 via the connection unit 150 and disk control unit 140.

According to the present embodiment, the information of the OS log or core dump can be transmitted to the center 780 quickly and efficiently.

(Register Dump Collection-related Diagrams and Flow)

FIG. 24 shows the configuration of the storage device system attained during collection of a register dump. FIG. 25 shows a flow starting with detection of a fault in the I/O processor 119 and ending with transmission of a register dump collection notification to the center 780. Herein, the flow is described with the CPU 112, I/O processor 119, management terminal 160, and memory 113 associated with one another.

A register dump is collected after the I/O processor 119 senses a fault. What is referred to as a fault is, for example, an abnormality in the temperature of the CPU 112 or an event that no response is returned from the OS 701 during a health check. Moreover, a register dump is collected during collection of a full dump that will be described later. The register dump is a dump that can be collected as long as the I/O processor 119 is active even if the CPU 112 and OS 701 are inactivated because of a fault.

The I/O processor 119 senses a fault occurring in the CPU 112 via the communication memory 802 or hardware register (step 1 of the I/O processor 119). In this case, the I/O processor 119 acquires minimum information from the memory 113 and the register in the CPU 112 via the communication memory 802 or hardware register (step 2 of the I/O processor 119). The I/O processor 119 transfers the acquired information to the management terminal 160 over the internal LAN or bus (step 3 of the I/O processor 119). When the transfer terminates, the I/O processor 119 issues a transfer termination notification to the management terminal 160 over the internal LAN or bus (step 4 of the I/O processor 119). With the termination of the transfer, the management terminal 160 learns the fact that the register dump has been collected. The management terminal 160 then transmits a register dump collection notification to the center 780 (step 5 of the management terminal 160). In response to the register dump collection notification, the center 780 uses the remote control software 781 to access the remote management agent 782 included in the management terminal 160, and then collects the register dump (step 6 of the management terminal 160).

According to the present embodiment, the information of the register dump can be transmitted to the center 780 quickly and efficiently.

(Full Dump Collection-related Diagram and Flow)

FIG. 26 shows the configuration of the storage device system attained during collection of a full dump.

The first and second channel control units CHN110 share the same software and hardware configurations and belong to the same cluster. The second CPU 112 and second I/O processor 119 included in the second channel control unit CHN110 are, similarly to the first CPU 112 and first I/O processor 119 included in the first channel control unit CHN110, connected to the management terminal 160 over the internal LAN or bus. The first I/O processor 119 in the first channel control unit CHN110 and the second I/O processor 119 in the second channel control unit CHN110 transfer information to or from each other via the connection unit 150. FIG. 27 describes a flow starting with an event that the second CPU in the second channel control unit CHN110 gets into a panic and ending with transmission of a full dump connection notification to the center 780. Herein, the flow is described with the first CPU 112, first I/O processor 119, second CPU 112, second I/O processor 119, management terminal 160, and associated storage device 300 (fault information storage LU) associated with one another. According to the present embodiment, the first and second channel control units CHN110 constitute a cluster. Alternatively, a larger number of channel control units CHN110 may constitute a cluster. Herein, a description will proceed on the assumption that the second channel control unit CHN110 gets into a panic.

If the second CPU 112 gets into a panic (step 1 of the second CPU 112), the information of a crash dump is transmitted to the second I/O processor 119 via the second communication memory 802 or hardware register in order to write the crash dump in the fault information storage LU (step 2 of the second CPU 112). The second I/O processor 119 transfers the information of the crash dump to an associated disk control unit 140 via the connection unit 150. The disk control unit 140 writes the information of the crash dump in the fault information storage LU in response to a directive given from the second I/O processor 119. The fault information storage LU is defined so that any channel control unit CHN110 can store information therein. The crash dump is therefore transmitted to the fault information storage LU.

Thereafter, the second CPU 112 sets a crash notification bit in the communication memory 802 or hardware register, and thus notifies the second I/O processor 119 of the crash. The second I/O processor 119 checks the crash notification bit in the communication memory 802 or hardware register so as to recognize that the crash dump has been transmitted to the fault information storage LU (step 3 of the second CPU 112). The second CPU 112 keeps operating while being in a panic. Therefore, when the notification terminates, the second CPU 112 is forcibly halted (step 4 of the second CPU 112). The second I/O processor 119 having recognized that the crash dump has been transmitted to the fault information storage LU notifies the first I/O processor 119 via the connection unit 150 that the crash dump has been transmitted to the fault information storage LU (step 5 of the second I/O processor). At this time, preferably, the second I/O processor 119 checks if the OS 701 running in the first CPU 112 can transfer the dump to the management terminal 160 or if the controller microprogram running in the first I/O processor 119 runs normally. Thereafter, preferably, the second I/O processor 119 notifies that the crash dump has been transmitted to the fault information storage LU. When numerous channel control units CHN110 constitute a cluster, preferably, the second I/O processor 119 selects a channel control unit CHN110, of which CPU 112 and I/O processor 119 are acting normally, from among the plurality of channel control units CHN110 constituting the cluster. The second I/O processor 119 then notifies that the crash dump has been transmitted to the fault information storage LU. The first I/O processor 119 activates a software program Door stored in the first communication memory 802 or hardware register so as to notify that the crash dump has been transmitted to the fault information storage LU (step 6 of the first I/O processor 119). The first CPU 112 reads the crash dump stored in the storage device (fault information storage LU) into the first memory 113 (step 7 of the first CPU 112). In the first memory 113, data is edited, compressed, and encrypted (step 8 of the first CPU 112). Since the crash dump requires a large storage capacity, it may be split if necessary. Otherwise, only necessary information out of the crash dump may be read into the first memory 113. The compression and encryption aim to, similarly to those performed on the OS log or core dump, decrease an amount of data to be transferred and a transfer time and reduce the cost and the risk of data leakage. After the editing, compression, and encryption in the first memory 113 are completed, the first CPU 112 transfers a full dump to the management terminal 160 over the internal LAN or bus (step 9 of the first CPU 112). In order to notify the management terminal 160 that transfer of a full dump has terminated, the first CPU 112 issues a transfer termination notification to the management terminal 160 over the internal LAN or bus (step 10 of the first CPU 112). In response to the transfer termination notification sent from the first CPU, the management terminal 160 issues a notification, which signifies that the full dump has been collected, to the center (step 11 of the management terminal 160). In response to the notification that the full dump has been collected, the center 780 uses the remote management software 781 to access the remote management agent 782 installed in the management terminal 160, and acquires the full dump (step 12 of the management terminal 160).

Although the management terminal and CPU 112 are connected directly to each other, since a Telnet demon that is a demon running on an OS is not activated, Telnet does not connect the management terminal to the CPU 112. Moreover, since there is no way of logging in the CPU at the management terminal according to the foregoing three methods, a user LU will not be accessed. When a fault occurs, a dump is automatically transferred to the management terminal 160, or the management terminal 160 is handled in order to issue an instruction to the I/O processor for dumping. Leakage of user information can therefore be prevented.

According to the embodiment of the present invention, the information of a full dump can be transmitted to the center 780 quickly and efficiently.

According to the present embodiment, once the aforesaid three dumping methods are adopted, if a fault occurs, information can be quickly and efficiently transmitted to the center 780. Eventually, the fault can be coped with quickly and efficiently.

The present embodiment has been described so far. The embodiment has been taken as the best example of the present invention but will not limit the invention. The present invention can be modified or innovated without a departure from the gist thereof. The present invention encompasses other embodiments having the constituent features of the present invention.

What is claimed is:

1. A disk array system comprising:
    a plurality of storage devices in which data is stored;
    a storage device control unit that controls storage of data in said plurality of storage devices;
    a connection unit connected to said storage device control unit;
    a first communication control unit that is connected to said storage device control unit via said connection unit and connected onto a first network external to said own disk array system, and that transfers file data over said first network;
    a cache memory that temporarily stores data transferring between said first communication control unit and said storage device control unit; and
    a management terminal managing a plurality of resources of said disk array system and being used for acquiring information on fault occurring in said disk array system, said fault information being used to search a reason for said fault, wherein:
    said first communication control unit comprises:
    a first processor that associates file data, which is transferred over said first network, with block-form data that is stored in said storage device control unit; and
    a second processor configured to prevent the first processor from being directly accessed by said management terminal by transferring data to said cache memory in response to a request made by said first processor, by transferring to the first processor an instruction to collect said fault information in said disk array system based on a request sent from said management terminal, by reading information on managing said fault occurring in said disk array system from said plurality of storage devices in response to the request for the information made by said first processor, and then by transmitting the information to said first processor.

2. A disk array system according to claim 1, wherein when said second processor receives the request for the information on managing the fault in said disk array system from said management terminal, said second processor transfers the request for the information on managing the fault in said disk array system to said first processor.

3. A disk array system according to claim 2, wherein on receipt of the request for the information on managing the fault in said disk array system, said first processor requests said second processor to read the information on managing the fault in said disk array system which is recorded in said plurality of storage devices, and to transfer the information to said first processor.

4. A disk array system according to claim 3, wherein in response to the request for the information sent from said first processor, said second processor requests said storage device control unit via said connection unit to transfer the information on managing the fault in said disk array system.

5. A disk array system according to claim 4, wherein said storage device control unit reads the information on managing the fault in said disk array system from said plurality of storage devices, and transfers the information to said second processor via said connection unit.

6. A disk array system according to claim 5, wherein said second processor transfers the information on managing the fault in said disk array system, which is sent from said storage device control unit, to said first processor.

7. A disk array system according to claim 6, wherein said first processor transmits the information on managing the fault in said disk array system, which is sent from said second processor, to said management terminal.

8. A disk array system according to claim 1, further comprising a second communication control unit that is connected to said storage device control unit via said connection unit, and connected on a second network external to said own disk array system, and that transfers file data over said second network, wherein said second communication control unit comprises:
  a third processor that associates file data, which is transferred over said second network, with block-form data that is stored in said storage device control unit; and
  a fourth processor that transfers data in response to a request made by said third processor, and transfers information on managing a fault occurring in said third processor to said storage device control unit in response to a request made by said third processor.

9. A disk array system according to claim 8, wherein said fourth processor notifies said second processor that a fault has occurred in said third processor; and said second processor notifies said first processor that a fault has occurred in said third processor.

10. A disk array system according to claim 9, wherein in response to a request made by said first processor, said second processor transmits the information on managing the fault in said third processor, which is recorded in said plurality of storage devices, to said first processor.

11. A fault information control method of a disk array system comprising the steps of:
  providing the disk array system with a plurality of storage devices in which data is stored; a storage device control unit that controls storage of data in said plurality of storage devices; a connection unit connected to said storage device control unit; and a first conununication control unit that is connected to said storage device control unit via said connection unit and connected onto a first network external to said own disk array system, and that transfers file data over said first network; a cache memory that temporarily stores data transferring between said first communication control unit and said storage device control unit; and a management terminal managing a plurality of resources of said disk array system, said first communication control unit including a first processor and a second processor;
  associating by said first processor file data, which is transferred over said first network, with block-form data that is stored in said storage device control unit; transferring by said first processor the block-form data that is stored in said storage device control unit; and making a request for information on managing a fault occurring in said own disk array system by said first processor;
  preventing the first processor from being directly accessed by said management terminal by transferring data by said second processor to said cache memory, which is sent from said first processor, via said connection unit, by transferring by said second processor to said first processor an instruction to collect information on a fault in said disk array system based upon a request from said management terminal, by reading by said second processor the information on managing the fault in said disk array system from said plurality of storage devices and then by transmit the information to said first processor; and
  using said management terminal to acquire information on fault occurring in said disk array system, and using said fault information to search a reason for said fault.

12. A fault information control method of a disk array system according to claim 11, wherein said second processor reads the information on managing the fault in said disk array system from said plurality of storage devices, in response to the request for the information on the fault in said disk array system from said management terminal.

13. A fault information control method of a disk array system according to claim 12, further comprising requesting by said second processor said storage device control unit via said connection unit to transfer the information on managing the fault in said disk array system in response to the request sent from said first processor.

14. A fault information control method of a disk array system according to claim 13, further comprising reading by said storage device control unit the information on managing the fault in said disk array system from said plurality of storage devices, and transferring by said storage device control unit the information to said second processor via said connection unit.

15. A fault information control method of a disk array system according to claim 14, further comprising transferring by said second processor the information on managing the fault in said disk array system, which is sent from said storage device control unit, to said first processor.

16. A fault information control method of a disk array system according to claim 15, further comprising transmitting by said first processor the information on managing the fault in said disk array system, which is sent from said second processor, to said management terminal.

17. A fault information control method of a disk array system according to claim 11, further comprising:
  providing a second communication control unit including a third processor and a fourth processor;
  connecting said second communication control unit to said storage device control unit via said connection unit and onto a second network external to said own disk array system, said second communication control unit transferring file data over said second network;
  associating by the third processor file data, which is transferred over said second network, with block-form data that is stored in said storage device control unit; transferring by the third processor the block-form data that is stored in said storage device control unit; and making a request for information on managing a fault occurring in said own disk array system by the third processor; and
  transferring by the fourth processor data, which is sent from said third processor, via said connection unit; and transferring by the third processor information on managing a fault occurring in said third processor, to said storage device control unit in response to a request made by said third processor.

18. A fault information control method of a disk array system according to claim 17, further comprising:
  notifying said second processor by said fourth processor that a fault has occurred in said third processor;
  notifying said first processor by said second processor that the fault has occurred in said third processor; and
  transmitting by said second processor the information on managing the fault in said third processor, which is recorded in said plurality of storage devices, to said first processor in response to a request made by said first processor.

* * * * *